US012578202B2

(12) United States Patent
Zhou

(10) Patent No.: US 12,578,202 B2
(45) Date of Patent: Mar. 17, 2026

(54) NAVIGATION PROCESSING METHOD AND APPARATUS

(71) Applicant: Tencent Technology (Shenzhen) Company Limited, Shenzhen (CN)

(72) Inventor: Zhitong Zhou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 324 days.

(21) Appl. No.: 17/991,714

(22) Filed: Nov. 21, 2022

(65) Prior Publication Data

US 2023/0092830 A1    Mar. 23, 2023

Related U.S. Application Data

(63) Continuation of application No. PCT/CN2022/086263, filed on Apr. 12, 2022.

(30) Foreign Application Priority Data

May 10, 2021    (CN) .......................... 202110507698.6

(51) Int. Cl.
G01C 21/36 (2006.01)
G06F 3/0482 (2013.01)
(Continued)

(52) U.S. Cl.
CPC ..... G01C 21/3694 (2013.01); G01C 21/3697 (2013.01); G08G 1/0125 (2013.01);
(Continued)

(58) Field of Classification Search
CPC ............ G01C 21/3694; G01C 21/3697; G01C 21/3691; G01C 21/3647; G08G 1/0125;
(Continued)

(56) References Cited

U.S. PATENT DOCUMENTS 5,434,927 A * 7/1995 Brady ................... G08G 1/015
348/148
5,982,298 A * 11/1999 Lappenbusch ....... G08G 1/0969
340/995.13
(Continued)

FOREIGN PATENT DOCUMENTS

CN      103886769 A      6/2014
CN      107152935 A      9/2017
(Continued)

OTHER PUBLICATIONS

Kwak, 'Seeing is Believing: Sharing Real-Time Visual Traffic Information via Vehicular Clouds', IEEEAccess, published 2016 (Year: 2016).*
(Continued)

*Primary Examiner* — Kenny Nguyen
(74) *Attorney, Agent, or Firm* — ArentFox Schiff LLP

(57) ABSTRACT

A navigation processing method is provided. In the method, a map is displayed in a user interface. A navigation route for a vehicle is displayed on the map in response to a navigation operation, for example, of a user. If at least one condition is satisfied, a video portal of a target road segment is displayed in the navigation route. The target road segment is in a target state indicating at least one of a jammed state, an accident state, or a damaged state of the target road segment. If a triggering operation is performed on the video portal, a video of the target road segment can be played. The video can be a live streaming video or a recorded video. The video can include captured scene information of the target road segment. Apparatus and non-transitory computer-readable storage medium counterpart embodiments are also contemplated.

19 Claims, 10 Drawing Sheets

(51) Int. Cl.
 *G08G 1/01*   (2006.01)
 *G08G 1/0969*  (2006.01)
 *H04N 7/18*   (2006.01)

(52) U.S. Cl.
 CPC ........... *G08G 1/0969* (2013.01); *H04N 7/181*
   (2013.01); *G06F 3/0482* (2013.01)

(58) Field of Classification Search
 CPC .... G08G 1/0969; H04N 7/181; G06F 3/0482;
    G06F 3/048; G06F 3/14; G06F 3/16;
    G06F 9/451; G06F 3/1407; G06F 3/167
 USPC ......................................................... 701/431
 See application file for complete search history.

(56)       References Cited

U.S. PATENT DOCUMENTS

| | | | | |
|---|---|---|---|---|
| 9,058,703 | B2 * | 6/2015 | Ricci ................. | G06Q 30/0265 |
| 9,418,153 | B2 * | 8/2016 | Mao ................. | G08B 13/19656 |
| 10,062,280 | B2 * | 8/2018 | Nguyen ............... | H04W 4/029 |
| 11,107,502 | B2 * | 8/2021 | Wang ................... | G11B 27/102 |
| 12,284,411 | B2 * | 4/2025 | Zhou ........................ | G06F 16/29 |
| 2007/0070069 | A1 * | 3/2007 | Samarasekera ......... | G06F 3/011 |
| | | | | 707/E17.013 |
| 2007/0118281 | A1 * | 5/2007 | Adam ............... | G08G 1/09675 |
| | | | | 340/995.13 |
| 2009/0256906 | A1 * | 10/2009 | Ilsaka ................ | G01C 21/3647 |
| | | | | 345/638 |

| | | | | |
|---|---|---|---|---|
| 2016/0034477 | A1 * | 2/2016 | Mao ......................... | H04N 9/87 |
| | | | | 386/353 |
| 2016/0358467 | A1 * | 12/2016 | Jeong ................... | G08G 1/0133 |
| 2017/0069205 | A1 * | 3/2017 | Nguyen ........... | G08G 1/096775 |
| 2017/0072850 | A1 * | 3/2017 | Curtis ............... | B60W 50/0097 |
| 2017/0132922 | A1 * | 5/2017 | Gupta .................... | H04L 67/12 |
| 2017/0146353 | A1 * | 5/2017 | Kroeller ............... | G08G 1/0969 |
| 2018/0174376 | A1 * | 6/2018 | Avary .................... | G07C 5/008 |
| 2018/0276962 | A1 * | 9/2018 | Butler ............. | G08B 13/19669 |
| 2019/0087492 | A1 * | 3/2019 | Wu ......................... | G06F 16/29 |
| 2023/0084001 | A1 * | 3/2023 | Zhou ................. | H04N 21/4316 |
| | | | | 725/38 |
| 2024/0118793 | A1 * | 4/2024 | Triverio ............. | G06Q 10/1095 |

FOREIGN PATENT DOCUMENTS

| | | |
|---|---|---|
| CN | 111325971 A | 6/2020 |
| JP | 2013156096 A | 8/2013 |
| WO | 2007148698 A1 | 12/2007 |

OTHER PUBLICATIONS

Fickas, Route-following assistance for travelers with cognitive impairments: a comparison of four prompt modes, Science Direct, Published by Elsevier 2008 (Year: 2008).*

International Search Report and Written Opinion in PCT/CN2022/086263, mailed Jun. 23, 2022, 13 pages.

\* cited by examiner

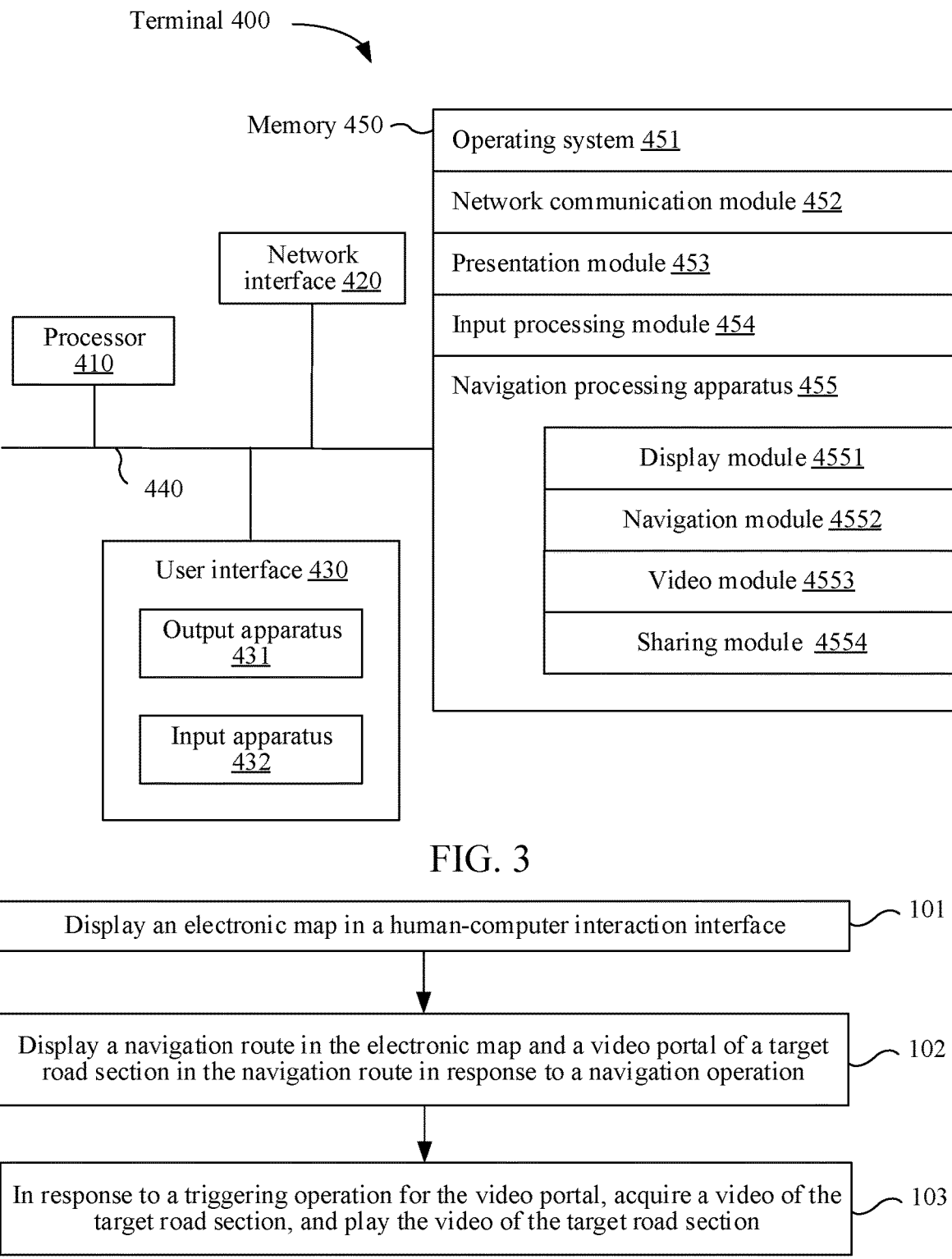

Terminal 400

Memory 450

Operating system 451

Network communication module 452

Presentation module 453

Input processing module 454

Navigation processing apparatus 455

Display module 4551

Navigation module 4552

Video module 4553

Sharing module 4554

Network interface 420

Processor 410

440

User interface 430

Output apparatus 431

Input apparatus 432

FIG. 3

Display an electronic map in a human-computer interaction interface 101

Display a navigation route in the electronic map and a video portal of a target road section in the navigation route in response to a navigation operation 102

In response to a triggering operation for the video portal, acquire a video of the target road section, and play the video of the target road section 103

FIG. 4A

NAVIGATION PROCESSING METHOD AND APPARATUS

RELATED APPLICATIONS

The present application is a continuation of International Application No. PCT/CN2022/086263 filed on Apr. 12, 2022, which claims priority to Chinese Patent Application No. 202110507698.6, entitled "NAVIGATION PROCESSING METHOD AND APPARATUS, ELECTRONIC DEVICE, COMPUTER-READABLE STORAGE MEDIUM AND COMPUTER PROGRAM PRODUCT" and filed on May 10, 2021. The entire disclosures for the prior applications are hereby incorporated by reference in their entirety.

FIELD OF THE TECHNOLOGY

This application relates to an Internet technology, including a navigation processing method and apparatus, an electronic device, a computer-readable storage medium and a computer program.

BACKGROUND OF THE DISCLOSURE

An intelligent transportation system can include an Intelligent Vehicle Infrastructure Cooperative System (IVICS). The vehicle infrastructure cooperative system uses advanced wireless communication and new-generation Internet technologies to comprehensively implement dynamic real-time information interaction of vehicle-to-vehicle and vehicle-to-road, and perform active vehicle safety control and road collaboration management based on acquisition and integration of full-time and full-space dynamic traffic information, thus realizing effective collaboration of people, vehicles and roads, improving traffic safety and traffic efficiency, thereby forming a safe, efficient, and environmentally friendly road traffic system.

In a navigation process of the related technologies, when a traffic jam is determined on a certain road section ahead, traffic jam information is issued for the road section, and different colors can be marked on a route earthworm line. For example, the green color represents a smooth traffic; the yellow color represents a slow traffic; and the red color represents a traffic jam. However, it is difficult to acquire finer-grained road information from navigation data. If a current navigation process is displayed, more human-computer interaction resources is consumed, and safe driving may be hindered.

SUMMARY

Embodiments of this disclosure provide a navigation processing method and apparatus, an electronic device, a non-transitory computer-readable storage medium and a computer program, which can safely and efficiently present road states in a navigation scenario.

Technical solutions in the embodiments of this disclosure can be implemented as follows.

According to an aspect of the embodiments of this disclosure, a navigation processing method is provided. In the method, a map is displayed in a user interface. A navigation route for a vehicle is displayed on the map in response to a navigation operation, for example, of a user. If at least one condition is satisfied, a video portal of a target road segment is displayed in the navigation route. The target road segment is in a target state indicating at least one of a jammed state, an accident state, or a damaged state of the target road segment. If a triggering operation is performed on the video portal, a video of the target road segment can be played. The video can be a live streaming video or a recorded video. The video can include captured scene information of the target road segment.

According to an aspect of the embodiments of this disclosure, a navigation processing apparatus is provided. The navigation processing apparatus includes processing circuitry that is configured to display a map in a user interface. The processing circuitry is configured to display a navigation route for a vehicle on the map in response to a navigation operation, for example, of a user. If at least one condition is satisfied, the processing circuitry is configured to display a video portal of a target road segment in the navigation route. The target road segment can be in a target state indicating at least one of a jammed state, an accident state, or a damaged state of the target road segment. If a triggering operation is performed on the video portal, the processing circuitry is configured to play a video of the target road segment. The video can include captured scene information of the target road segment. The video can be a live streaming video or a recorded video.

According to an aspect of the embodiments of this disclosure, a non-transitory computer-readable storage medium is provided, storing instructions which when executed by a processor cause the processor to perform the navigation processing method according to the foregoing embodiment.

An embodiment of this disclosure provides a computer program product, including a computer program or instruction. When executed by a processor, the computer program or instruction implements the navigation processing method provided in the embodiments of this application.

The embodiments of this disclosure have the following beneficial effects:

By providing a video portal of a target road section in a target state, a user is allowed to trigger the video portal to play a video that displays real scene information (e.g., captured scene information that is captured by an image/video capturing device), so that road condition information can be intuitively and efficiently learned; the human-computer interaction operation is saved; the efficiency is high; and the driving safety is ensured.

It is to be understood that the above general descriptions and the following detailed descriptions are merely for exemplary and explanatory purposes, and do not limit the scope of this disclosure.

BRIEF DESCRIPTION OF THE DRAWINGS

The accompanying drawings herein, which are incorporated into the specification and constitute a part of this specification, show embodiments that conform to this disclosure, and are used for describing a principle of this disclosure together with this specification. The accompanying drawings in the following description show merely some embodiments of this disclosure. Other embodiments are within the scope of the present disclosure. In the accompanying drawings:

FIG. 3 shows a schematic structural diagram of an electronic device according to an embodiment of this disclosure.

FIG. 4A-4C show flowcharts of a navigation processing method according to an embodiment of this disclosure.

DESCRIPTION OF EMBODIMENTS

Figure 1:
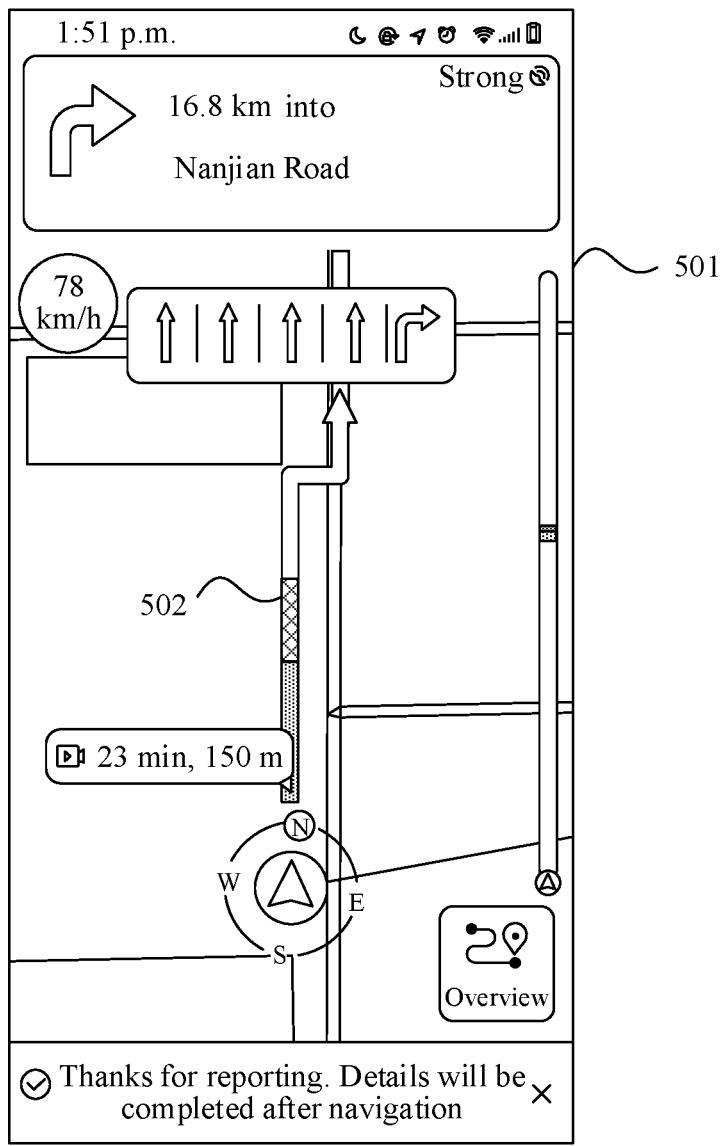
FIG. 1 shows a schematic diagram of a product interface of a navigation product provided in the related technology.

To make objectives, technical solutions, and advantages of this disclosure clearer, the following describes this disclosure in further detail with reference to the accompanying drawings. The described embodiments are not to be considered as a limitation to this disclosure. All other embodiments obtained by a person of ordinary skill in the art shall fall within the protection scope of this disclosure.

In the following description, the term "some embodiments" describes subsets of all possible embodiments, it may be understood that "some embodiments" may be the same subset or different subsets of all the possible embodiments, and can be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this disclosure described herein can be implemented in a sequence in addition to the sequence shown or described herein.

Unless otherwise defined, meanings of all technical and scientific terms used in this specification are the same as that is understood by a person skilled in the related technologies to which this disclosure belongs. In this disclosure, terms used in the specification of this disclosure are merely intended to describe objectives of the specific embodiments, but are not intended to limit this disclosure.

Before the embodiments of this disclosure are further described in detail, a description is made on nouns and terms in the embodiments of this disclosure, and the nouns and terms in the embodiments of this disclosure are applicable to the following explanations.

1) "In response to" is used to represent a condition or state on which one or more operations to be performed depend. When the condition or state is satisfied, the one or more operations may be performed immediately or after a set delay. Unless explicitly stated, there is no limitation on the order in which the plurality of operations is performed.

2) Client can be an application program running in a terminal to provide various services, such as an electronic map (or a map), a taxi booking client, an instant messaging client, and/or the like.

3) Jammed state: A road section (or a road segment) can be in a jammed state when a running speed of a vehicle in the road section is less than a second speed threshold. The jammed state can indicate a road condition (e.g., a traffic condition) of the road segment, for example, a traffic jam on the road segment.

4) Damaged state: A road quality (e.g., a road surface quality) of a road section is quantitatively characterized by a quality evaluation result of the road section. The quality evaluation result can be calculated on the basis of at least one of a road surface humidity, a road surface friction coefficient, a road surface flatness, and the like. In an example, the quality evaluation result is calculated based on whether the road section includes pavement damage(s), such as a pot hole. The road section can be determined to be in a damaged state when the quality evaluation result is less than a quality evaluation threshold. The damaged state can indicate a road condition of the road segment.

5) Accident state: A road section is determined to be in an accident state when the road section is in an accident-prone state or is in an accident. The road section is determined to be in the accident-prone state when an accident occurrence frequency of the road section in a current time period is greater than an accident occurrence frequency threshold.

FIG. 1 is a schematic diagram of a product interface of a navigation product provided in the related technology. In a navigation process of the related technology, a human-computer interaction interface (or a user interface) 501 displays a navigation route. When a certain road section ahead is determined to have a traffic jam, traffic jam information about the road section can be issued. Different patterns are marked on a route earthworm line (or a route line) 502. For example, no pattern represents a smooth traffic; shadow represents a slow traffic; and crosswire represents a traffic jam. During implementation of this embodiment of this disclosure, the applicant (or a user) has found that only a spatio-temporal relationship between a jammed road section and a current route can be seen in FIG. 1. A real condition of the jammed road section cannot be displayed. In the related technology, real-time road condition data cannot be acquired during navigation and displayed in the navigation process.

Embodiments of this disclosure provide a navigation processing method and apparatus, an electronic device, a computer-readable storage medium and a computer program product (or a computer program), which can play a road condition video of a road section if the road section is determined to be in a target state in the navigation process, so as to display finer-grained and more accurate road condition information via video(s), improve the display efficiency of a human-computer interaction interface and improve the information acquisition efficiency of a user. An exemplary application of the electronic device provided in an embodiment of this disclosure is described below. The electronic device provided in this embodiment of this disclosure can be implemented as various types of terminals, such as a vehicle-mounted terminal, an intelligent voice interaction device, an aircraft, a smart home appliance, a notebook computer, a tablet computer, and a mobile device (e.g., a cell phone, a portable music player, a personal digital assistant, a dedicated messaging device, and a portable gaming device). The embodiments of this disclosure may be applied to a variety of scenarios including, but not limited to, a cloud technology, artificial intelligence, intelligent transportation, assisted driving, etc. Exemplary applications will be described below when the electronic device is implemented as a terminal.

Figure 2:
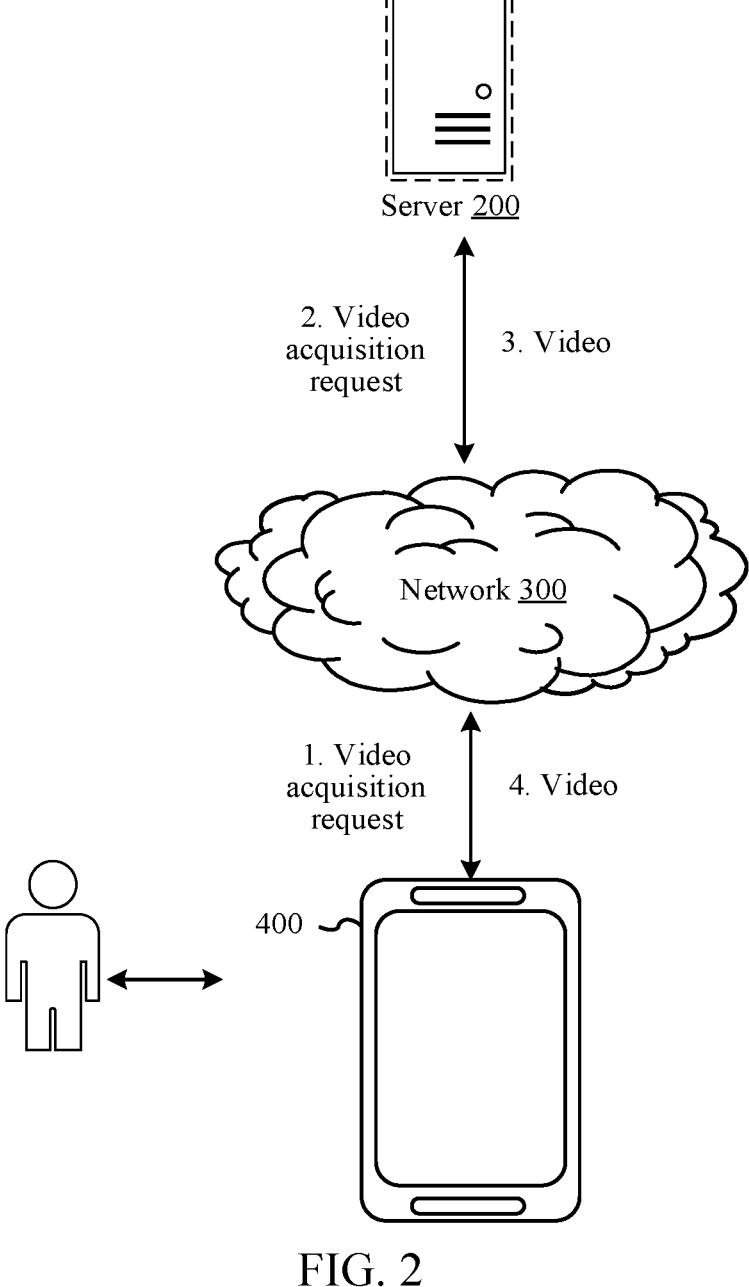
FIG. 2 shows a schematic structural diagram of a navigation processing system according to an embodiment of this disclosure.

FIG. 2 is a schematic structural diagram of a navigation processing system according to an embodiment of this disclosure. A terminal 400 is connected to a server 200 through a network 300. The network 300 may be a wide area network or a local area network, or a combination of the two. A navigation route is displayed on the terminal 400 in response to a navigation operation of a user on the terminal. A video portal can be displayed on a corresponding road section (or a road segment) of the navigation route when the road section has a traffic jam. In response to a triggering operation (e.g., sending a video acquisition request) for the video portal, a video of the road section is acquired from the server and played on the terminal 400.

In some embodiments, when the video is a video that has been already cached in the terminal, in response to the triggering operation performed on the video portal, the video of the road section can be directly acquired from the terminal and played on the terminal 400. For example, in case of traffic control, the video of the road section may be acquired for the first time from the server 200, and the video is played and cached in the terminal 400. In an example, traffic conditions under the traffic control are relatively simple, the video belongs to a recorded video. In response to the triggering operation performed on the video portal of the same road section again, it may not be necessary to acquire the video from the server 200, and the cached video can be acquired directly from the terminal 400 and the cached video can be played.

In some embodiments, the server 200 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 400 may be a vehicle-mounted terminal, an intelligent voice interaction device, an aircraft, a smart home appliance, a notebook computer, a tablet computer, and a mobile device (e.g., a cell phone, a portable music player, a personal digital assistant, a dedicated messaging device, and a portable gaming device), and the like. The terminal 400 may be equipped with, but is not limited to, a client such as an instant messaging client, a game client, and an electronic map client. The terminal and the server may be directly or indirectly connected in a wired or wireless communication manner. This is not limited in the embodiments of this disclosure.

Next, the structure of the electronic device for implementing the navigation processing method provided in this embodiment of this disclosure is described. The electronic device provided in this embodiment of this disclosure may be the terminal 400 in FIG. 2. FIG. 3 is a schematic structural diagram of an electronic device provided in an embodiment of this disclosure. The terminal 400 shown in FIG. 3 includes: at least one processor 410, a memory 450, at least one network interface 420, and a user interface 430. Each component in the terminal 400 is coupled together through a bus system 440. The bus system 440 can be configured to implement connection and communication between the components. In addition to a data bus, the bus system 440 may further include a power bus, a control bus, and a state signal bus. For purposes of brevity, various types of buses are labeled as the bus system 440 in FIG. 3.

The processor 410 may be an integrated circuit chip having a signal processing capability, such as a general purpose processor, a Digital Signal Processor (DSP), or other programmable logic devices, a discrete gate or transistor logic device, and a discrete hardware assembly. The general purpose processor may be a microprocessor or any related processor, and the like.

The user interface 430 includes one or more output apparatuses 431 that can display media content, including one or more speakers and/or one or more visual display screens. The user interface 430 further includes one or more input apparatuses 432, including a user interface component helping a user input, for example, a keyboard, a mouse, a microphone, a touch display screen, a camera, or another input button and control member.

The memory 450 may be a removable memory, a non-removable memory, or a combination thereof. Exemplary hardware devices include a solid-state memory, a hard disk drive, an optical disc drive, or the like. The memory 450 may include one or more storage devices that are physically away from the processor 410.

The memory 450 includes a volatile memory or a non-volatile memory, or may include a volatile memory and a non-volatile memory. The non-volatile memory may be a read-only memory (ROM), and the volatile memory may be a random access memory (RAM). The memory 450 described in the embodiments of this disclosure is to include any other suitable type of memories.

In some embodiments, the memory 450 can store data to support various operations, examples of which include programs, modules, and data structures, or subsets or supersets thereof, as illustrated below.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another electronic device through one or more (wired or wireless) network interfaces 420. Exemplary network interfaces 420 include: Bluetooth, wireless compatible authentication (WiFi), a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, the navigation processing apparatus provided in this embodiment of this disclosure may be implemented in software. FIG. 3 shows a navigation processing apparatus 455 stored in a memory 450, which can be software in the form of a program and a plug-in, including the following software modules: a display module 4551, a navigation module 4552, a video module 4553, and a sharing module 4554. These modules are logic, so that any combination or further division can be performed according to the functions realized, and the functions of each module will be described below.

Next, the navigation processing method according to this embodiment of this disclosure will be described. During actual implementation, the navigation processing method for a vehicle according to this embodiment of this disclosure may be implemented by the terminal 400 shown in FIG. 3 alone, or may be implemented by the terminal 400 in cooperation with the server 200.

The navigation processing method provided in this embodiment of this disclosure and implemented by the terminal 400 alone is taken as an example for description below.

The following qualitative descriptions of road sections, such as traffic jam and slowdown, can all be divided quantitatively by data. For example, a road section where a road travel speed is less than a certain speed threshold is taken as a jammed road section.

FIG. 4A is a flowchart of a navigation processing method according to an embodiment of this disclosure. Steps shown in FIG. 4A are described.

In step 101, an electronic map (or a map) is displayed in a human-computer interaction interface (or a user interface).

Figure 5A:
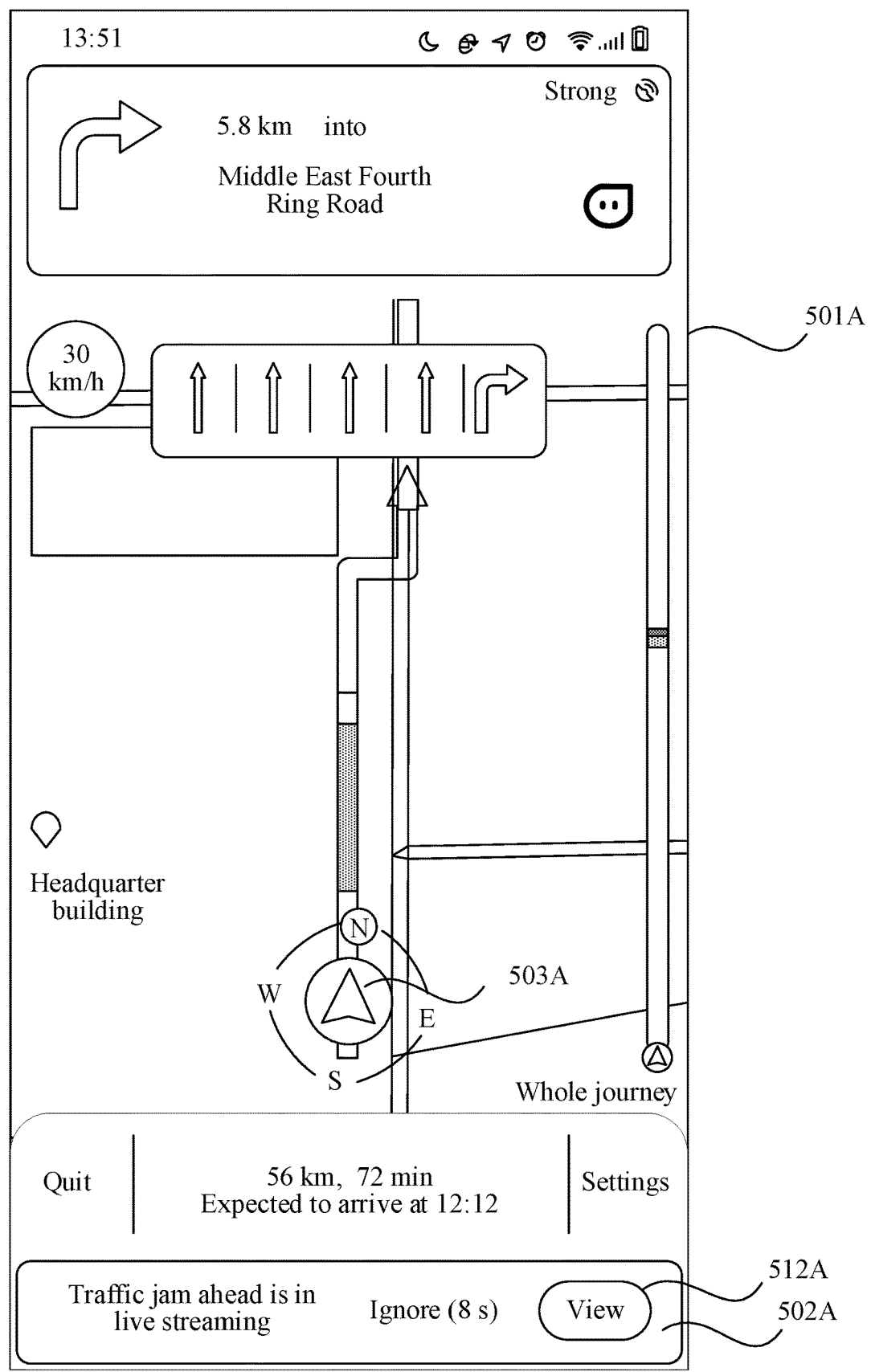
FIG. 5A-5E show schematic diagrams of a human-computer interaction interface according to an embodiment of this disclosure.

As an example, after an electronic map client is initialized, the electronic map is displayed on the human-computer interaction interface, and the displayed electronic map includes a real-time positioned position (or a real-time position) based on a user coordinate. FIG. 5A is a schematic diagram of a human-computer interaction interface provided in an embodiment of this disclosure. An electronic map is displayed on the human-computer interaction interface 501A, and an identifier 503A in the electronic map is used to indicate the real-time positioned position of a user.

In step 102, a navigation route is displayed in the electronic map and a video portal of a target road section (or a target road segment) in the navigation route is displayed in response to a navigation operation.

As an example, when the target road section is in a target state, the video portal of the target road section in the navigation route is displayed on the electronic map. The navigation route is a route from a starting point to a destination. The starting point and the destination are acquired according to the navigation operation. The target road section includes at least one of a jammed state, an accident state, and a damaged state.

The state in this embodiment of this disclosure may have various meanings and may be used for indicating a traffic jam level, a road quality, and the like. In some embodiments, a state of a road section indicates the road condition, such as a traffic condition, a road quality, whether an accident occurs or is likely to occur on the road section, and the like.

In some embodiments, when the state is used for indicating the traffic jam level, states corresponding to different traffic jam levels include: jammed (or a jammed state), smooth (or a smooth state), and slow (or a slow state). Being slow (or a slow state) is a driving state between the jammed state and the smooth state. When the state is used for indicating the road quality, states corresponding to different road qualities include: good; obstructed by rain and snow; and containing pavement damage. When the state is used for indicating an accident, different states include an accident-prone state indicating that an accident is likely to occur on the road section, a safe state indicating no accident on the road section, and an accident occurring state indicating that an accident occurs on the road section. The road section can be in one or more states, for example, the road section can be in the jammed state and the accident occurring state.

As an example, the target state is at least one of the above-mentioned states. For example, the target state may be the jammed state, the accident state, or the damaged state for indicating a pavement damage degree of a road. When the state is used for indicating the traffic jam level, the states indicating different traffic jam levels may be divided (or categorized) by a quantitative index. In an embodiment, the quantitative index is a speed of a vehicle traveling on the road section. For example, the road section is determined to be in a smooth state when a road travel speed (or a speed) of a vehicle exceeds a first speed threshold. The road section is determined to be in a jammed state when the road travel speed of the vehicle does not exceed the second speed threshold. The road section is determined to be in a slow state when the road travel speed of the vehicle is between the first speed threshold and the second speed threshold. The first speed threshold is greater than the second speed threshold. The state can also be determined according to a traffic flow in addition to the road travel speed of the vehicle. In an embodiment, the quantitative index is a traffic flow of the road section. The traffic flow in the road section is greater than a first traffic flow threshold when the road section is in the jammed state. The traffic flow in the road section is less than a second traffic flow threshold when the road section is in the smooth state. The traffic flow in the road section is not less than the second traffic flow threshold and not greater than the first traffic flow threshold when the road section is in the slow state. The second traffic flow threshold is less than the first traffic flow threshold.

As an example, when the state is used for indicating the road quality, the states indicating different road qualities may be divided (or categorized) by a quality evaluation of a road section. The road section is determined to be in a good state when the road section neither has a pothole and other damages nor is hindered by rain and snow. The road section is determined to be obstructed by rain and snow when there are rain and snow in the road section. In an example, the road section obstructed by rain and snow is determined to be in a damaged state when the quality evaluation result of the road section is less than the quality evaluation threshold. The road section is determined to be in a pavement damage state when there is a pavement damage in the road section. In an example, the road section with the pavement damage is determined to be in a damaged state when the quality evaluation result of the road section is less than the quality evaluation threshold.

In some embodiments, upon receiving the navigation operation, whether a jammed road section ahead of the positioned position (or the position) in the navigation route is determined. In an example, the position in the navigation route is a current position of the vehicle. When a jammed road section is determined, the jammed road section is taken as a target road section, and a video portal of the target road section in the navigation route is displayed on the electronic map. During driving, when a new jammed road section ahead of the positioned position in the navigation route is determined, the new jammed road section is taken as a target road section, and a video portal of the target road section in the navigation route is displayed on the electronic map. The jammed road section is a road section in a jammed state.

In some embodiments, step 102 of displaying a navigation route in the electronic map may be achieved by the following embodiments: allocating corresponding display parameters for road sections in different states in the navigation route. Different states correspond to different display parameters The display parameters corresponding to the target state can be more significant than the display parameters corresponding to non-target state(s), for example, the display parameters corresponding to the target state can have a stronger visual impact than the display parameters. The non-target state(s) can include state(s) that are different from the target states (e.g., the jammed state, the accident state, the damaged state). The road sections in the different states can be displayed according to the display parameters of the different states. Since the road sections in different states are displayed by means of different display parameters, the display discrimination (or differentiation) of different road sections in the electronic map can be effectively improved, so as to improve the information acquisition efficiency of a user. The display parameters corresponding to the target state can have a stronger visual impact than the display parameters corresponding to non-target states. For example, the display parameter corresponding to the non-target state is a green color with a weak visual impact, and the display parameter corresponding to the target state is a red color with a strong visual impact.

As an example, FIG. 1 is a schematic diagram of a product interface of a navigation product provided in the relevant technology. The navigation route in FIG. 1 is shown via the route earthworm line 502. The route earthworm line 502 can use different display parameters for different road sections, such as different patterns or colors. The display parameters corresponding to the target state are more significant (or have a stronger visual impact) than the display parameters corresponding to the non-target states, so as to significantly display the road section in the target state. For example, the display parameter corresponding to the non-target state is a green color with a weak visual impact, and the display parameter corresponding to the target state is a red color with a strong visual impact.

Figure 4B:
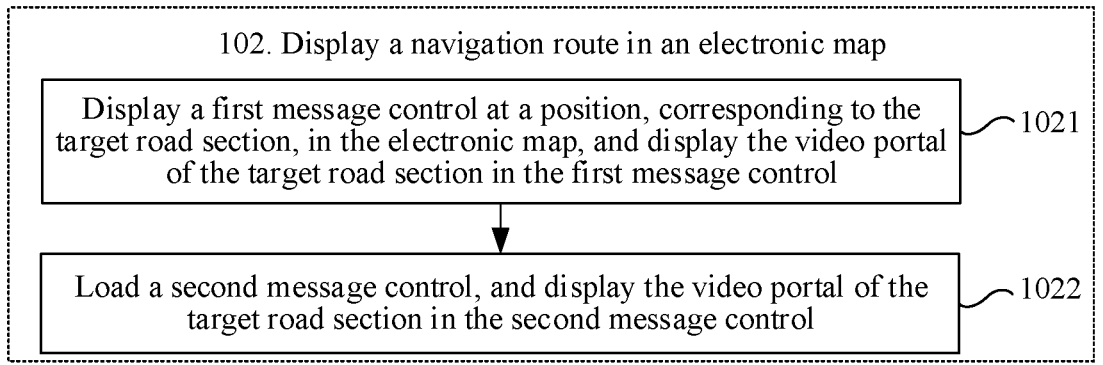

In some embodiments, FIG. 4B is a flowchart of a navigation processing method provided in an embodiment of this disclosure. Step 102 of displaying a video portal of the target road section in the navigation route may be implemented by at least one of step 1021 and step 1022.

In step 1021, a first message control (or a first message) is displayed at a position in the electronic map. The position can correspond to the target road section. The video portal of the target road section can be displayed in the first message control.

In step 1022, a second message control (or a second message) can be loaded and the video portal of the target road section can be displayed in the second message control.

Figure 5B:
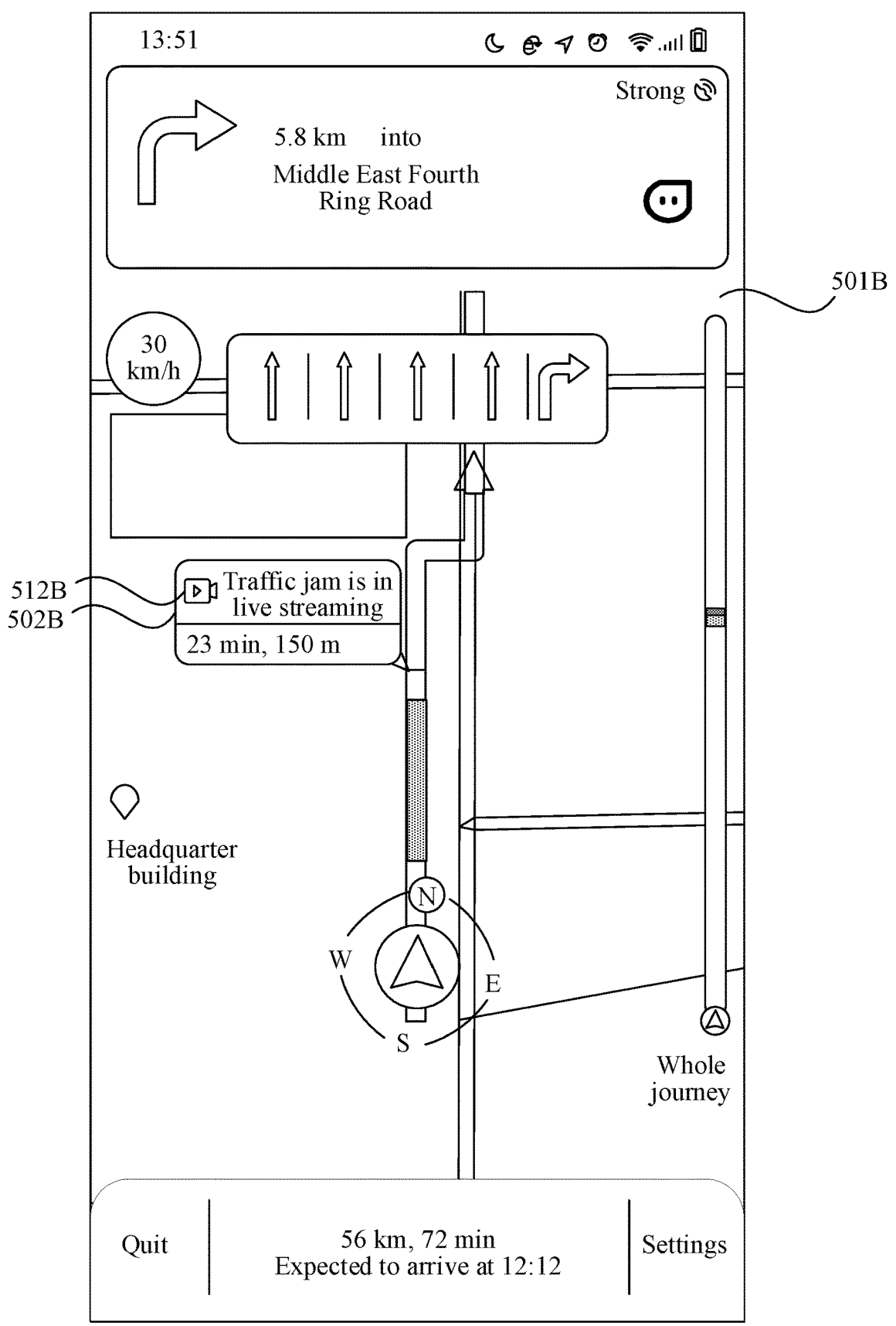

As an example, FIG. 5B is a schematic diagram of a human-computer interaction interface provided in an embodiment of this disclosure. A jammed road section is displayed in a human-computer interaction interface 501B. A first jam bubble 502B (an example of the first message control displayed at a position corresponding to the target road section) may appear on the jammed road section, and the video portal of the target road section is displayed in the first jam bubble 502B, for example, an icon 512B indicating the video portal is displayed in the first jam bubble 502B. If the triggering operation is performed on the video portal, for example, by clicking the icon 512B, the video of the target road section can be played. Since the first message control is displayed at the corresponding target position, the correlation between the first message control and the target road section can be improved, so as to play a prompting role more efficiently, and the information acquisition efficiency of a user can be improved. FIG. 5A is a schematic diagram of a human-computer interaction interface provided in an embodiment of this disclosure. First prompt information 502A (an example of the second message control covering a part (or a portion) of the electronic map) is displayed at a location (e.g., a bottom) of a human-computer interaction interface 501A, and the video portal of the target road section is displayed in the first prompt information 502A, for example, a "View" button 512A indicating the video portal is displayed in the first prompt information 502A. If the triggering operation is performed on the video portal, for example, by clicking the "View" button 512A, the video of the target road section can be played. The second message control covers a part of an area or the whole area (or an entire area) of the electronic map. Since the second message control is loaded, the second message control is not a normally displayed control, and the displaying of the second message control plays a stronger prompting role and can improve the information acquisition efficiency of a user.

In some embodiments, at least one piece of following information is displayed in the first message control or the second message control: a length of the target road section, and expected passing time of the target road section. The expected passing time of the target road section can refer to an estimated or expected travel time to pass through the target road section. The length of the target road section and the expected passing time of the target road section both belong to data concerned by a user, and displaying the expected passing time and the length in the message control can effectively improve the utilization rate of display resources.

As an example, referring to FIG. 5B, the length of the target road section and the expected passing time of the target road section are displayed in the first jam bubble 502B (the first message control displayed at the position corresponding to the target road section), such as 150 meters and 23 minutes, indicating that the length of the target road section is 150 meters, and the expected time to pass the target road section is 23 minutes.

In some embodiments, in step 102, before displaying a video portal of a target road section in the navigation route, if at least one of the following conditions is satisfied is determined: a network communication environment (also referred to as a network environment or a networking environment) of the electronic map is in an available state; the electronic map is in an online navigation mode; the speed of a vehicle is less than a speed threshold; and a distance between the vehicle and an image capturing device (e.g., an image/video capturing device) of the target road section is less than a distance threshold. If the at least one of the above conditions is determined to be satisfied, the displaying the video portal of the target road section in the navigation route can be performed. The reasons are below. When the network communication state is unavailable, video data cannot be acquired through the electronic map and the video cannot be played. If the electronic map is in a non-online navigation mode, a user does not need to learn about a real-time road condition of the road section in the target state, thereby affecting the user experience of the user normally using the electronic map. When the speed of a vehicle is not less than the speed threshold, playing a video can result in unsafe driving. If the distance between the vehicle and the image capturing device of the target road section is not less than the distance threshold, the vehicle is far from the jammed road section, and a video of the target road section does not need to be played.

In some embodiments, in step 102, before displaying a video portal of a target road section in the navigation route, a traveled mile range (or a traveled distance) of a vehicle is acquired. The traveled mile range can be a mileage (or a distance) that the vehicle has traveled since the last time (or a previous time) the video portal is displayed for the target state. If the traveled mile range is greater than a reminder mile range threshold (or a reminder distance threshold), the displaying the video portal of the target road section in the navigation route can be performed.

As an example, in order not to generate strong interference to the driving of the user, the traveled mile range between two adjacent times of displaying the video portal is to be greater than the reminder mile range threshold, for example, when displaying the video portal of the target road section through the second message control that covers a part of the electronic map. Since the second message control may cover a part of the electronic map, the view of the user browsing the electronic map may be affected. Thus, a distance (the traveled mile range) between the two adjacent times of displaying the video portal is set to be greater than the reminder mile range threshold.

In some embodiments, in step 102, before displaying a video portal of a target road section in the navigation route, a historical prompt record of the navigation route is acquired, and the number of times the video portal is displayed for the target route is acquired from the historical prompt record. and determine, in a case that the number of times is less than a threshold of the number of prompts, to proceed with processing of performing the displaying a video portal of a target road section in the navigation route. For example, whether the number of times is less than a threshold of a number of prompts is determined. If the number of times is less than the threshold of the number of prompts, the displaying a video portal of a target road section in the navigation route is performed.

As an example, the historical prompt record of the navigation route is acquired, and the number of times the corresponding video portal is displayed for the target route is acquired from the historical prompt record. For example, when a user uses the electronic map, the video of the target road section is prompted to the user for 10 times. When the number of times is less than a threshold of the number of prompts, it is determined to proceed with the processing of performing the displaying a video portal of a target road section in the navigation route. When the number of times is not less than the threshold of the number of prompts, in order to avoid the user from repeatedly acquiring the video of the same target road section, it is determined not to proceed with the processing of performing the displaying a video portal of a target road section in the navigation route. For example, the user will pass jammed target road section A in daily driving. At each time the user passes target road section A at the morning peak, the video portal is prompted to the user, which is not conductive to safe driving of the user and may also generate information interference. By this way, the driving safety of a vehicle can be ensured, and resources consumed by displaying redundant information can also be saved.

In step 103, in response to a triggering operation performed on the video portal, a video of the target road section is acquired, and the video of the target road section is played. The video can include real scene information of the target road section. The video can indicate the road condition including a traffic flow, an accident scene, a road quality, a weather condition, and the like of the target road section.

In some embodiments, the video of the target road section is played in response to the triggering operation performed on the video portal. The playing of the video of the target road section can be achieved by the following technical solution: Acquire a video of the target road section, and play the video of the target road section, that is, acquire and play the video of the target road section.

As an example, the video may be displayed at a fixed location on the electronic map. For example, an upper right corner of the electronic map is used as an area for playing the video, or the video may be played in an area of the human-computer interaction interface that is independent of the electronic map, such as playing the video in a split screen.

In some embodiments, a function of automatically playing a video is provided. When the navigation route and the video portal of the target road section in the navigation route are displayed on the electronic map, an urgency degree (or a degree of urgency) of the target state is determined according to a distance between a vehicle and the target road section, and a remaining window time (or a remaining time window) for the vehicle to change a route to detour the target road section (e.g., to deviate from the navigation route to bypass the target road section). Both the distance between the vehicle and the target road section and the remaining window time have an impact on the urgency degree. The urgency degree is in negative correlation with the distance between the vehicle and the target road section, and is also in negative correlation with the remaining window time. The urgency degree can be quantitatively determined by means of a weighted summation. If the urgency degree of the target state is greater than a degree threshold, the processing of automatically playing the video of the target road section is proceeded, for example, playing the video of the target road section is automatically performed. Since playing the video of the target road section is automatically performed, the video portal that is manually triggered may not be required. If the distance between the vehicle and the target road section is shorter and the remaining window time for the vehicle to change a route to detour the target road section is shorter, the urgency degree of the target state is higher. When the urgency degree is greater than the degree threshold, the video is automatically played, so that the driving safety of the vehicle can be ensured, and enough time is provided for the user to adjust an optimized route.

As an example, in the process that the vehicle runs according to the navigation route, a detour position is between the positioned position (or the position) of the vehicle and the target road section. The time taken by the vehicle to travel from the positioned position to the detour position is the remaining window time for the vehicle to change the route to detour the target road section. For example, the vehicle is 500 m away from the target road section, and the remaining window time is 1 min. A corresponding urgency degree is determined according to the above-mentioned negative correlation. When the urgency degree exceeds the degree threshold, the processing of automatically playing the video of the target road section can be performed. For example, when the vehicle is 500 m from the target road section and the remaining window time is 1 min, the processing of automatically playing the video of the target road section is automatically performed.

In some embodiments, when the target state is the jammed state, before acquiring a video of the target road section, a state of each road section in the navigation route at a first moment is determined according to historical traffic flow sequence data of each road section in the navigation route at a plurality of historical moments, and the first moment is a moment that the triggering operation performed on the video portal is received. The state of each road section can indicate a road condition of the respective road segment in the navigation route. The state of each road section can be the jammed state or a state that is different from the jammed state. The plurality of historical moments can be prior to the first moment. At least one road section that is in the jammed state is determined as the target road section. The states of the road sections at the first moment are predicted based on the historical traffic flow sequence data of the historical moments, so that the target road section acquisition efficiency can be improved.

As an example, a historical traffic flow of each road section in the navigation route at each historical moment is similar to a certain extent. A traffic flow of a road section in the navigation route at the first moment (e.g., 8 a.m. of a Thursday) can be similar or identical to a historical traffic flow of the road section in the navigation route at corresponding historical moment(s) (e.g., 8 a.m. of previous Thursday(s)). For example, a road section between the Donghu tunnel and the Hongmiao flyover is in a jammed state at 8 a.m. every weekday, and is in a smooth state at 8 a.m. every weekend. If the moment that the triggering operation performed on the video portal is received is also 8 a.m. of a weekday, the road section can be determined to be in the jammed state at the first moment (e.g., 8 a.m. of the weekday), and the road section is determined to be a target road section.

In some embodiments, when the target state is the jammed state, before acquiring a video of the target road section, corresponding traffic flows of each road section in the navigation route at a plurality of different second moments are combined into a traffic flow sequence of the respective road segment, and traffic flows of each road section at a plurality of different third moments are determined according to the traffic flow sequence. The first moment can be the moment that the triggering operation performed on the video portal is received. Each of the second moments can be earlier than the first moment, and each of the third moments can be later than the first moment. A state of each road section in a case that the vehicle sequentially arrives at each road section is determined according to the speed of a vehicle and the traffic flows of each road section at the plurality of different third moments. For example, the state of each road segment at a respective moment that the vehicle arrives at the respective road segment is determined based on the speed of the vehicle and the determined traffic flows of each road segment at the plurality of third moments if the vehicle sequentially arrives at the respective road segment. The state can indicate a road condition of the respective road segment in the navigation route.

At least one road section in the jammed state at the arrival of the vehicle is taken as the target road section.

As an example, the corresponding traffic flows of each road section in the navigation route at the plurality of different second moments are combined into the traffic flow sequence. For example, there are two road sections (road section A and road section B) in the navigation route, and there are three different second moments (moment 1, moment 2, and moment 3). The second moments are past moments. The traffic flow sequence includes a traffic flow sequence corresponding to road section A. The traffic flow sequence corresponding to road section A is composed of a traffic flow of road section A at moment 1, a traffic flow of road section A at moment 2, and a traffic flow of road section A at moment 3. The traffic flow sequence includes a traffic flow sequence corresponding to road section B. The traffic flow sequence corresponding to road section B is composed of a traffic flow of road section B at moment 1, a traffic flow of road section B at moment 2, and a traffic flow of road section B at moment 3. The traffic flows of each road section at the plurality of different third moments are respectively determined according to the traffic flow sequence of each road section. This determination can be achieved by means of a time sequence prediction algorithm. There are three different third moments (moment 4, moment 5, and moment 6). Specifically, a traffic flow of road section A at moment 4, a traffic flow of road section A at moment 5 and traffic flow of road section A at moment 6 are predicted through the traffic flow of road section A at moment 1, the traffic flow of road section A at moment 2, and the traffic flow of road section A at moment 3.

For a certain road section, a traffic flow of a future moment is predicted on the basis of the traffic flow of the road section at the past moment. The time sequence prediction algorithm is taken as an example. The traffic flow of road section A at moment 4 is an average value of the traffic flow of road section A at moment 1, the traffic flow of road section A at moment 2 and the traffic flow of road section A at moment 3. The traffic flow of road section A at moment 5 is an average value of the traffic flow of road section A at moment 2, the traffic flow of road section A at moment 3 and the traffic flow of road section A at moment 4. The traffic flow of road section A at moment 6 is an average value of the traffic flow of road section A at moment 3, the traffic flow of road section A at moment 4 and the traffic flow of road section A at moment 5. By parity of reasoning, the traffic flow of road section B at moment 4, the traffic flow of road section B at moment 5 and the traffic flow of road section B at moment 6 can be obtained. Moment when the vehicle arrives at road section A and road section B are determined according to the speed of the vehicle and the distances between the vehicle and different road sections. States of road section A and road section B when the vehicle arrives at road section A and road section B in turn are determined according to the traffic flows of road section A and road section B at the plurality of different third moments. For example, the vehicle arrives at road section A at moment 4. The traffic flow of road section A at moment 4 is predicted to contain 100 vehicles, so this road section is in the corresponding jammed state which conforms to the target state. Road section A is used as the target road section.

As an example, a traffic flow sequence (e.g., future traffic flow data) of the third moment is determined according to the corresponding traffic flow sequence (e.g., historical traffic flow data) of the second moment, and then the state of each road section (e.g., a future state of the road section) when a vehicle arrives at each road section in turn is determined, so that road sections that may be possibly jammed at the future arrival (e.g., at a future moment when the vehicle arrives at the respective road section) are taken as target road sections. Future traffic flow data of a road section can be accurately predicted on the basis of the historical traffic flow data of the road section through the time sequence prediction algorithm, so that a future state of the road section can be determined. The road section at the current moment may not be a jammed road section. When a vehicle drives to the road section, the road section may be in a jammed state. Thus, displaying a video in advance may enable a user to take an action as early as possible, such as asking for optimizing the route. The vehicle can travel according to an optimized route.

Figure 4C:
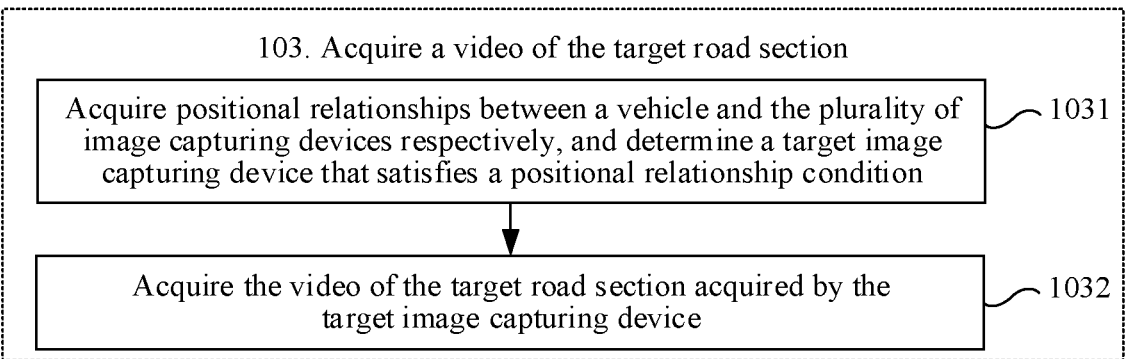

In some embodiments, FIG. 4C is a flowchart of a navigation processing method provided in an embodiment of this disclosure. When the target road section is provided with a plurality of image capturing devices, step 103 of acquiring a video of the target road section may be achieved through steps 1031 to 1032 shown in FIG. 4C.

In step 1031, positional relationships between a vehicle and the plurality of image capturing devices are acquired respectively, and a target image capturing device that satisfies a positional relationship condition can be determined.

In step 1032, the video of the target road section acquired by the target image capturing device is obtained.

In some embodiments, step 103 of playing the video of the target road section may be achieved by the following technical solution: positional relationships between a vehicle and the plurality of image capturing devices are acquired respectively, and a target image capturing device that satisfies a positional relationship condition is determined. The video of the target road section acquired by the target image capturing device can be obtained and played. The video satisfying the positional relationship condition and acquired by the target image capturing device is played, so that the target image capturing device can acquire a video most relevant to the target road section, thereby providing a user with the most effective real scene information.

As an example, the positional relationship condition includes one of the following: the distance from the vehicle to the target image capturing device is shortest among distances from the vehicle to the plurality of image capturing devices; the target image capturing device is located in front of the vehicle, and no other image capturing devices are located between the target image capturing device and the vehicle; and a central portion of an acquisition area that is acquired by the target image capturing device includes the vehicle, the acquisition area belongs to the image capturing device for a real-time road condition of a road.

In some embodiments, when the target road section is provided with a plurality of image capturing devices, step S103 of acquiring a video of the target road section may be achieved by the following technical solution: an image capturing device list can be displayed, the image capturing device list includes the plurality of image capturing devices and corresponding acquisition orientations (capturing orientations). A selected target image capturing device can be determined from the plurality of image capturing devices in response to a selection operation performed on the list. The video of the target road section acquired by the target image capturing device can be obtained. The target acquisition device is determined by a user, which can ensure that the real scene information included in the video of the target road section is requested by the user, thereby improving the human-computer interaction efficiency.

In some embodiments, step 103 of playing the video of the target road section may be achieved by the following technical solution: an image capturing device list can be displayed, and the image capturing device list includes the plurality of image capturing devices and corresponding acquisition orientations. A selected target image capturing device is determined from the plurality of image capturing devices in response to a selection operation performed on the list. The video of the target road section acquired by the target image capturing device can be obtained and played. The target acquisition device is determined by means of an option of a user, which can ensure that the real scene information included in the video of the target road section is requested by the user, thereby improving the human-computer interaction efficiency.

As an example, an image capturing device in an image capturing device list is a traffic camera on a road or a vehicle-mounted camera of a vehicle traveling on the target road section.

In some embodiments, step 103 of acquiring the video of the target road section may be achieved by the following technical solution: a video acquisition request can be transmitted to a video proxy server. The video acquisition request can carry a video provider identifier and a video type. The video proxy server can acquire, according to the video provider identifier, a playing address of the video type posted by a corresponding video provider. The playing address returned by the video proxy server can be received, and the video of the target road section can be acquired on the basis of the playing address. The video type can include a live video (e.g., a live streaming video) and a recorded video. The live video and/or the recorded video can include captured scene information of the target road section. The scene information of the target road section can be captured by an image/video capturing device.

Figure 6:
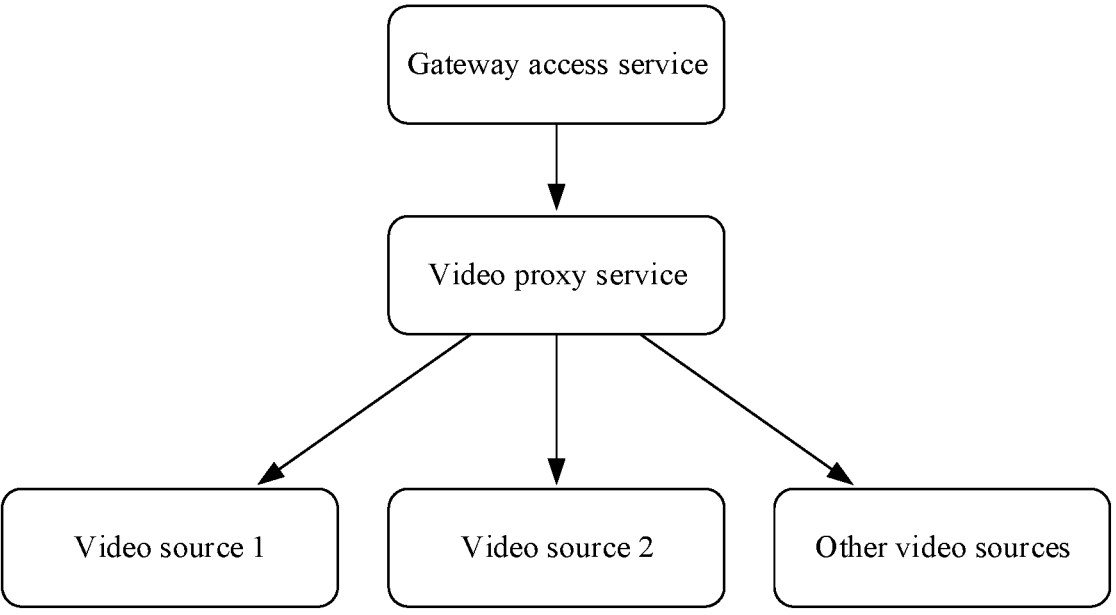
FIG. 6 shows a video acquisition architecture diagram of a navigation processing method according to an embodiment of this disclosure.

As an example, a plurality of video providers provides videos. Therefore, a video proxy can be configured to provide a transfer service. FIG. 6 is a video acquisition architecture diagram of a navigation processing method provided in an embodiment of this disclosure. Different video service providers (for example, video source 1 and video source 2) can be accessed through a video proxy service, for example, efficiently, and an electronic map client can use live streaming data of different data sources based on a gateway access service and the video proxy service, for example, without awareness of the different data sources. An interface field of the video proxy server that sends a proxy request can include: a video type, a video address and a video source (used for distinguishing the video providers); and a request source (used for distinguishing data requesters (e.g., users)). An interface field returned by the video proxy server can include follows: a result return code (the return code is used for indicating whether an error occurs in a request, for example, 1 indicating that the request is correct, and 0 indicating that the request is erroneous), result return information (the result return information is used for indicating whether a playing address is acquired), and a returned playing address. When the result return code is 1, and the result return information is that the playing address is acquired, the acquired playing address is returned to the electronic map client. In an example, the return code being 0 indicates that the request is correct, and the return code being −1 indicates that the request is erroneous.

In some embodiments, the playing address has timeliness, for example, the playing address is time-sensitive and temporary, and thus the video can only be played within a validity period. The above-mentioned receiving of the playing address returned by the video proxy server may be achieved by the following technical solution: a first key returned by the video proxy server can be received. An address acquisition request can be generated, and the address acquisition request can be transmitted to the video proxy server. The video proxy server returns an encrypted playing address, wherein the encrypted playing address is obtained by encrypting a second key corresponding to the first key. The playing address can be acquired if the encrypted playing address is decrypted by means of the first key, for example, successfully. The playing address is received in an encrypted manner, so that the security of a playing line can be ensured and the reliability of a video playing service can be improved. In an example, the above method can effectively prevent piracy.

Figure 7:
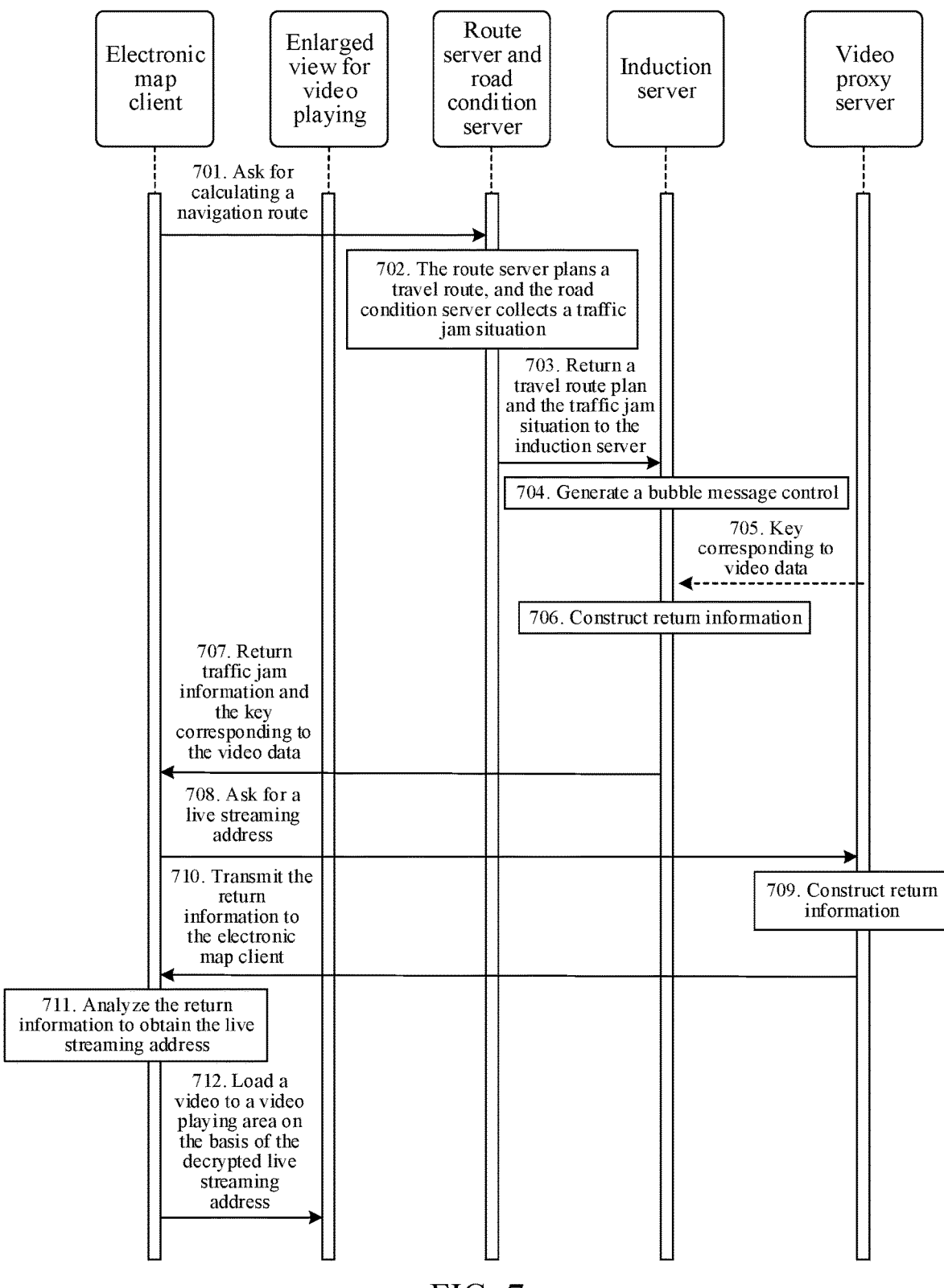
FIG. 7 shows a schematic diagram of a video acquisition logic of a navigation processing method according to an embodiment of this disclosure.

As an example, FIG. 7 is a schematic diagram of a video acquisition logic of a navigation processing method provided in an embodiment of this disclosure. A traffic jam event in navigation is related to a route server, a road condition server, and a server (e.g., an induction server). The induction server and the video proxy server may be the same server. In step 701, an electronic map client requests route calculation (e.g., for calculating a navigation route) from the route server and the road condition server. In step 702, the route server plans a travel route, and the road condition server collects a road condition, such as traffic jam information indicating a traffic jam situation. In step 703, the route server and the road condition server return a travel route plan and the road condition (e.g., the traffic jam situation) to the induction server. In step 704, the induction server generates a bubble message control including a triggering portal of a traffic jam video. In step 705, the video proxy server returns a key (e.g., the first key) corresponding to video data to the induction server. In step 706, the induction server constructs return information, for example, binding the bubble message control to the key to obtain the return information. In step 707, the induction server returns the road condition (e.g., the traffic jam information) and the key (e.g., the first key) of the corresponding video data to the electronic map client. In an example, step 707 is implemented via the route server and the road condition server, for example, in two steps. The induction server returns the road condition (e.g., the traffic jam information) and the key (e.g., the first key) of the corresponding video data to the route server and the road condition server and the route server and the road condition server returns the road condition (e.g., the traffic jam information) and the key (e.g., the first key) to the electronic map client. In step 708, the client asks for a video address (e.g., a live streaming address) from the video proxy server. In an example, step 708 is implemented via the route server and the road condition server, for example, in two steps. The client requests for the video address from the route server and the road condition server and the route server and the road condition server requests for the video address from the electronic map client. In step 709, the video proxy server constructs return information carrying the live streaming address encrypted by the second key. In step 710, the video proxy server transmits the return information to the electronic map client. In an example, step 710 is implemented via the route server and the road condition server, for example, in two steps. The video proxy server transmits the return information to the route server and the road condition server, and the route server and the road condition server transmits the return information to the electronic map client. In step 711, the electronic map client analyzes the return information to obtain the live streaming address, for example, decrypting the live streaming address that is analyzed by the first key and is encrypted by the second key to obtain a decrypted live streaming address. In step 712, the electronic map client loads a video to a video playing area on the basis of the decrypted live streaming address.

In some embodiments, during the playing the video of the target road section, a jammed position set in the target road section is acquired in response to a jammed position setting operation performed on the target road section in the video. When the passing time of the navigation route is determined to increase or a new navigation route with a passing time shorter than that of the navigation route is determined based on the jammed position of the navigation route, corresponding prompt information and the new navigation route are displayed. A user can be provided with a traffic jam solution to improve the human-computer interaction efficiency by means of displaying the new navigation route.

As an example, the jammed position set in the target road section is acquired. When the passing time of the navigation route is determined to increase according to the jammed position of the navigation route, for example, an increase amplitude (e.g., an increase in pass time) exceeds an amplitude threshold, or the new navigation route with the passing time shorter than that of the navigation route is determined, the corresponding prompt information and the new navigation route are displayed.

As an example, during the playing the video, in response to the jammed position setting operation performed on the target road section in the video, for example, an operation that the user clicks a certain position in a video frame, which may be specifically a certain position on a road, a certain lane may be specifically positioned through the operation of the user. The jammed position set in the target road section is acquired on the basis of the operation of the user, so that the set jammed position belongs to reliable information, and is updated to the navigation route. Thus, a navigation suggestion is acquired on the basis of the updated navigation route, so that a vehicle travel route can be adjusted in time.

During the acquisition of the navigation suggestion based on the updated navigation route, the passing time of the updated navigation route can be calculated. The corresponding prompt information and the new navigation route are displayed when it is determined, according to the jammed position of the navigation route, that the passing time of the navigation route increases, or the corresponding prompt information and the new navigation route are displayed when there is the new navigation route having the passing time shorter than that of the navigation route. Therefore, the navigation route is ensured to be an optimal route. The navigation route can be corrected based on opening a manual correction way, and the navigation accuracy is improved.

In some embodiments, a sharing message indicating that the target road section is in the target state is generated in response to a sharing operation, and the sharing message is transmitted to a social network user, the social network user including at least one of the following: a social network user traveling in the navigation route, and a social network user querying the navigation route. More users can know the specific condition of the target road section based on sharing, such as sharing the sharing message, thus improving the information transmission efficiency.

As an example, a third message control may be displayed at a position, corresponding to the target road section, in the electronic map, and a sharing portal of the target road section may be displayed in the third message control. A fourth message control covering a part of the electronic map may also be loaded, and a sharing portal of the target road section may be displayed in the fourth message control. The social network user includes at least one of the following: a social network user traveling in the navigation route, and a social network user querying the electronic map for the navigation route, wherein a distance between the social network user and the target road section is less than a set distance threshold.

In some embodiments, the playing of the video is stopped if a playing stop condition is satisfied. The playing stop condition can include at least one of the following: the target road section is no longer in the target state; a vehicle has passed the target road section; and an instruction to stop playing the video is received. By controlling the video to be stopped from being played, for example, by stopping the video, communication resources and display resources can be saved, and resource utilization rate can be increased.

As an example, the target road section is no longer in the target state. For example, the target road section is no longer a jammed road section, or the vehicle has passed the target road section. A real-time position of the vehicle may be acquired, and a positional relationship between the real-time position and the target road section may be determined to determine whether the vehicle has passed the target road section. The instruction to stop playing the video can be a user-triggered instruction, and the user-triggered instruction can be a touch control instruction or a speech instruction.

In some embodiments, during the displaying a navigation route in an electronic map, a group chat portal of the target road section in the navigation route can also be displayed. An execution logic (or a method) of displaying the video portal can be independent of an execution logic (or a method) of displaying the group chat portal. A group chat area is displayed in response to a triggering operation performed on the group chat portal. The group chat area can include at least one of the following users: (i) a social network user traveling in the target road section, and (ii) a social network user having a distance to the target road section less than a distance threshold and traveling to the target road section. The group chat area can be closed if a vehicle leaves the target road section or if an instruction to leave the group chat area or the group chat portal is received. By displaying the group chat area, the information acquisition efficiency of a user in a traffic jam situation can be improved. By closing the group chat area, the display resource utilization rate and the communication resource utilization rate can be increased.

As an example, the instruction to leave the group chat area/portal is a speech instruction or a touch control instruction. The group chat portal can be similar to the video portal. For example, the group chat portal can be similarly displayed as the video portal. A third message control may be displayed at a position, corresponding to the target road section, in the electronic map, and the group chat portal of the target road section is displayed in the third message control. A fourth message control covering a part of the electronic map may also be loaded, and the group chat portal of the target road section may be displayed in the fourth message control. The group chat portal and the video portal may be the same portal (e.g., the video portal is used for triggering video playing and group chat functions), or the group chat portal and the video portal are two different accesses (e.g., two different portals).

As an example, when a distance between the target road section and a next jammed road section is less than the set distance threshold, or the next road section is also a jammed road section, the group chat area is continuously maintained, e.g., the group chat area is not closed (e.g., the group chat area is displayed), so that a user can continue the interaction on the road condition information in the group chat area, thus maintaining the continuity of the interaction. When the distance to the next jammed road section is greater than the set distance threshold, the group chat area can be automatically hidden. In an example, when subsequent road sections are all smooth road sections, the group chat, such as the group chat area, can be automatically dissolved (or terminated).

As an example, a user is also provided with a manual group chat control function. The group chat area is closed in response to receiving the instruction to leave the group chat that is initiated by the user, so that interference caused by the group chat to the safe driving of the vehicle is avoided, and the driving safety is improved.

As an example, the group chat area is displayed in response to a triggering operation performed on the group chat portal. The group chat area floats on the electronic map for being displayed or is displayed on a split screen with the electronic map. When floating on the electronic map for being displayed, the group chat area may have a set transparency (e.g., 50%), so that the electronic map is not covered (or blocked) by the group chat area.

In some embodiments, after a video is played, in response to a screenshot recognition operation of the user, screen capture processing is performed on the played video, and a screen capture processing result is taken as an image to be recognized. Image recognition processing is performed on the image to be recognized via an image recognition technology, so as to obtain a jammed point. The jammed point can indicate a certain vehicle involved in a traffic accident or the like. For example, the jammed point is in a middle lane, and a navigation suggestion based on the jammed point can be displayed so as to prompt the user not to drive in the middle lane. The image processing technology is used for performing the image recognition processing on the screen capture processing result, so as to prompt the user of the identified jammed point, thereby prompting the user not to drive in the middle lane, and the traffic information acquisition accuracy can be improved.

An exemplary application of this embodiment of this disclosure in one practical application scenario is described below. In a vehicle travel process, a user can use the navigation function of the electronic map client to query the navigation route via the navigation function, and drive a vehicle according to the navigation route. A video portal is provided for a road section in a target state during the traveling, and real-time road condition information of the road section ahead in the target state is displayed through the video. The video (e.g., a live streaming video or a recorded video) of the road section ahead is shown on a navigation panel, so as to help the user to acquire the traffic jam ahead more conveniently.

Referring to FIG. 5A, the first prompt information 502A is displayed at the bottom of the human-computer interaction interface 501A to prompt the user that the traffic jam ahead is in live streaming. If a triggering operation is performed on the first prompt information 502A, a video of a road section is acquired and is played. After a set time, if the first prompt information 502A is still not triggered, for example, the triggering operation is performed on the first prompt information 502A, the human-computer interaction interface 501A does not display the first prompt information 502A, and skips to FIG. 5B. Referring to FIG. 5B, the human-computer interaction interface 501B displays a jammed road section, and a first jam bubble 502B appears on the jammed road section.

In some embodiments, the first prompt information 502A in FIG. 5A and the first jam bubble 502B in FIG. 5B may appear simultaneously for prompting, or may appear alternatively for prompting. For example, a prompt is made in the form of the first jam bubble 502B, and the first prompt information 502A is displayed at the same time at the beginning of the prompt. In an example, the first prompt information 502A is hidden after a set time, and only the first jam bubble 502B is displayed.

In some embodiments, the first jam bubble 502B or the first prompt information 502A of a road condition video may, for example, automatically, appear when one or more of the following conditions are satisfied: a network environment is available; a network traffic pattern is not a zero traffic mode (or a zero traffic pattern); a road is jammed or seriously jammed (e.g., the road is in the jammed state); a distance between a camera and a user is within a set distance, for example, a distance between a road condition service data camera, for examples, of the traffic department and a navigational position of a current user is within the set distance; a current vehicle speed is less than a set speed; after the first prompt information is hidden, the first prompt information no longer appears for the same situation within the set distance, so as to avoid that the electronic map is frequently covered; and when there are a plurality of cameras in a single jammed road section, data collected by one camera closest to the user is used as video data, and the first prompt information is displayed, for example, only once for the same road section, so as to avoid information interference to the user, which thus affects the safe driving. In an example, the conditions include: a state of moving the display and/or the state of zooming in the display collide with the road condition video prompt, such as the first jam bubble 502B or the first prompt information 502A of the road condition video.

In an example, the first jam bubble 502B or the first prompt information 502A of the road condition video appears. When the above conditions are satisfied, the road condition video is displayed, for example, automatically.

Figure 5C:
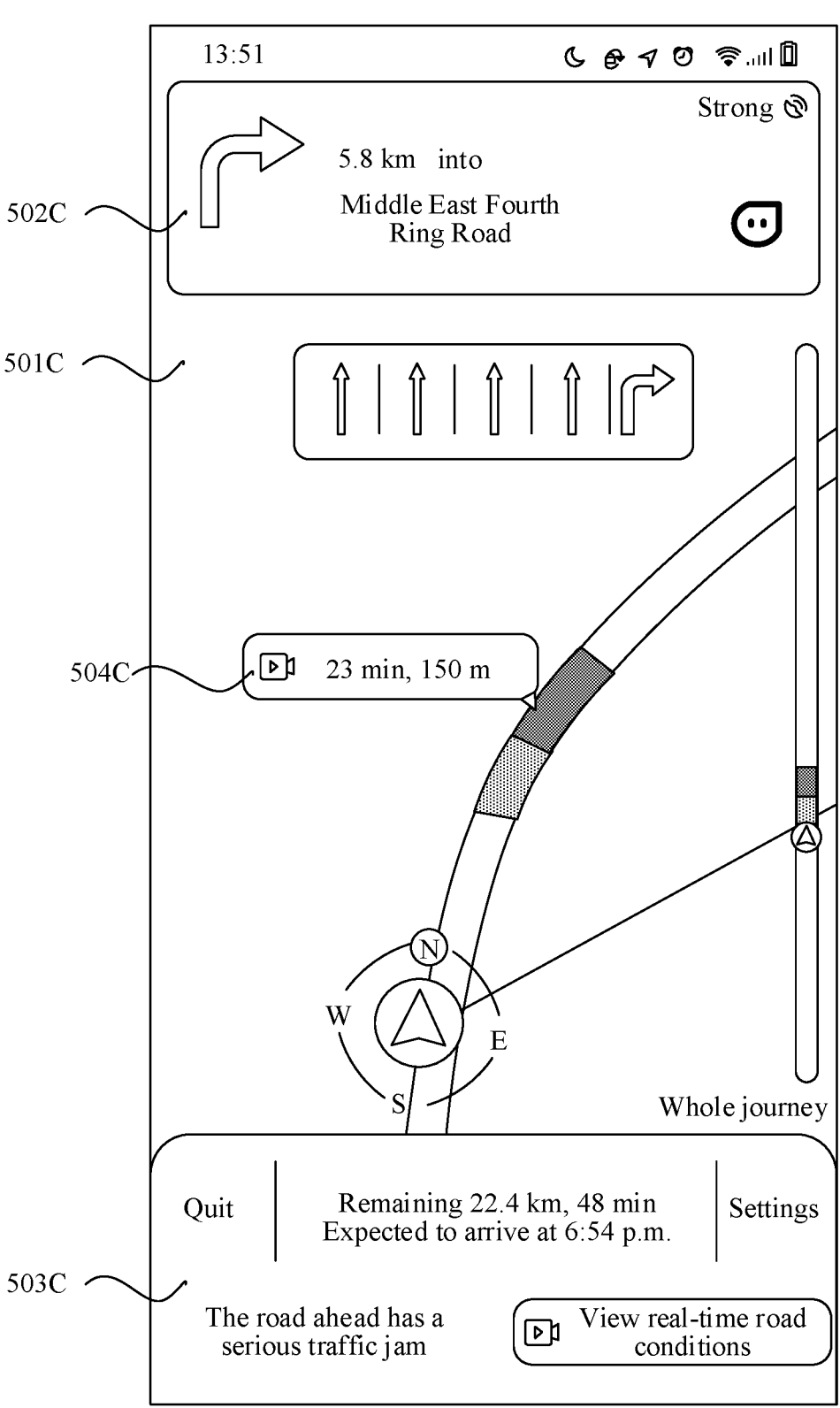
Figure 5D:
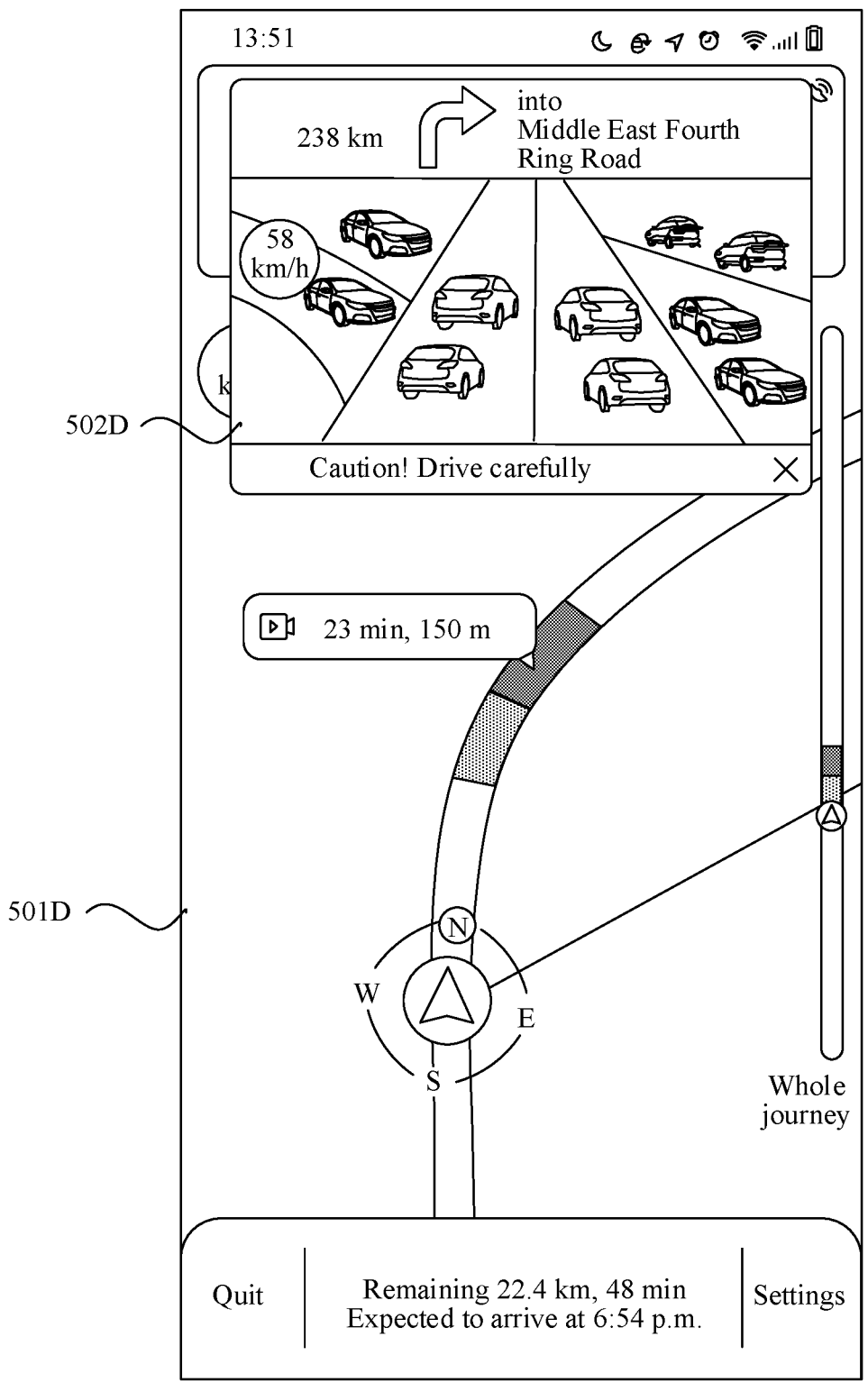
Figure 5E:
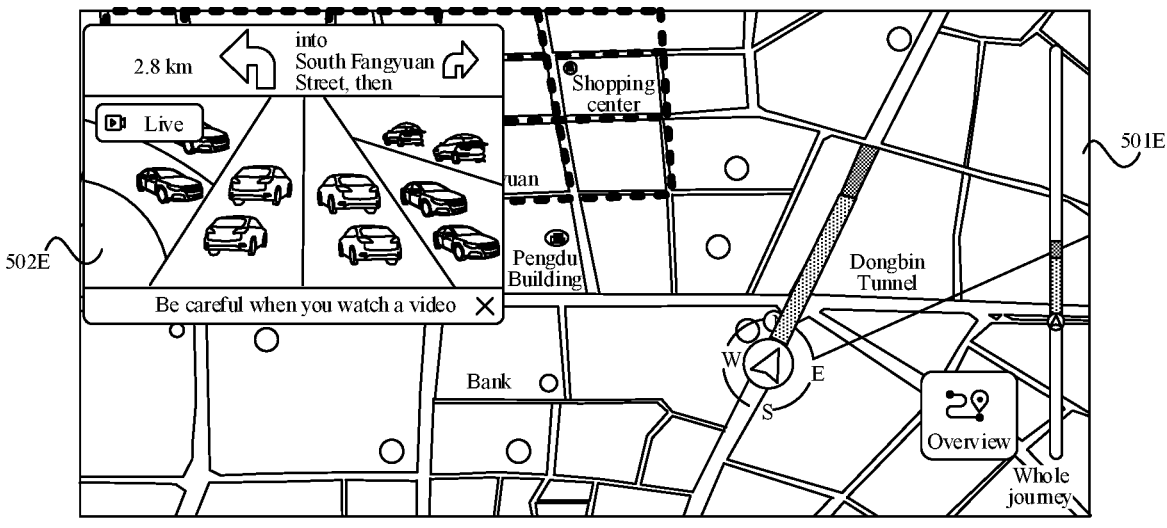

In some embodiments, FIG. 5C is a schematic diagram of a human-computer interaction interface provided in an embodiment of this disclosure. An intersection enlarged view area 502C is displayed at an upper portion of the human-computer interaction interface 501C. Second prompt information 503C is displayed at the bottom of the human-computer interaction interface 501C, so as to prompt a user that the road ahead has a traffic jam (e.g., a serious traffic jam). A second jam bubble 504C is displayed in the human-computer interaction interface 501C, so as to prompt the user of the passing time of the jammed road section ahead and the length of the jammed road section. A skip is made to the human-computer interaction interface 501D in FIG. 5D in response to a triggering operation performed on the second prompt information 503C or the second jam bubble 504C. The second prompt information 503C in FIG. 5C is different from the first prompt information 502A in FIG. 5A for the following reason. The first prompt information is aimed at live streaming data and the second prompt information is aimed at recorded data. The second jam bubble 504C in FIG. 5C is different from the first jam bubble 502B in FIG. 5B for the following reason. The first jam bubble is aimed at live streaming data and the second jam bubble is aimed at recorded data. FIG. 5D is a schematic diagram of a human-computer interaction interface provided in an embodiment of this disclosure. A navigation induction content can be displayed in an intersection enlarged view area 502D of the human-computer interaction interface 501D, and the intersection enlarged view area 502D is also used as a video area for displaying a video. The video area supports displaying a live streaming video and a recorded video. The live streaming video is a video automatically played after the map is turned on. In an example, dragging and moving the live streaming video, pausing the live streaming video, and playing the live streaming video in a full screen are not supported. When a link of the live streaming video fails or when there is no link, the recorded video with set time is automatically played, for example, for one minute. In an example, dragging and moving the recorded video, pausing the recorded video, and playing the recorded video in a full screen are not supported. FIG. 5E is a schematic diagram of a human-computer interaction interface provided in an embodiment of this disclosure. When a placement direction of a terminal changes, a display direction of the human-computer interaction interface 501E changes, and a certain area of the human-computer interaction interface 501E is used as the intersection enlarged view area 502E, so as to display the video of the jammed road section in the intersection enlarged view area 502E.

In some embodiments, there are a plurality of video providers. Therefore, a video proxy can be configured to provide a transfer service. Referring to FIG. 6, different video service providers can be efficiently accessed through a video proxy service, and an electronic map client can use live streaming data of different data sources, for example, without awareness of different data sources, via a gateway access service and the video proxy service. An interface field of the video proxy server that sends a proxy request can include: a video type, a video address and a video source (used for distinguishing the video providers); and a request source (used for distinguishing data requesters). An interface field returned by the video proxy server can include: a result return code, result return information and a returned playing address.

In some embodiments, referring to FIG. 7, a traffic jam event in navigation is related to a route server, a road condition server, and an induction server. The electronic map client can process a display avoidance relationship of other elements. For example, a video playing area is displayed in a partial area on the navigation panel in this embodiment of this disclosure, so that originally displayed elements on the navigation panel are possibly covered, or the video playing area and the originally displayed elements on the navigation panel avoid each other by means of processing the avoidance relationship.

In some embodiments, implementations for jammed roads may also be applied to other target state(s), such as a damaged road (e.g., a road in the damaged state), a temporary traffic flow-limited road, a road in the accident state, and/or the like. Therefore, the videos of the jammed road sections may be played in a traffic jam. Furthermore, videos of the corresponding states can also be played when a certain road section is in other states (such as the damaged road and the temporary traffic flow-limited road).

As an example, if an accident occurs ahead, a video of an accident road section may be displayed in order to remind a user to avoid the accident beforehand. If traffic control occurs in a certain road section ahead, a video of the traffic control road section may be displayed in order to remind the user to avoid the road section beforehand.

In some embodiments, a jammed state may be a current real-time state of a road section or a state (e.g., a future state) that is achieved when a vehicle runs to (or arrives at) a corresponding road section. When setting a navigation route, a traffic jam level can be calculated according to a real-time traffic flow of each road section of the navigation route. A road section with the traffic jam level exceeding a traffic jam level threshold is a road section whose real-time state is a jammed state. Future traffic flows of various road sections can be calculated (for example, using a time sequence prediction algorithm) according to in traffic flows and out traffic flows of the various road sections in the navigation route at a plurality of past time periods (e.g., minutes), and a traffic jam level can be calculated. An arrival time when a vehicle arrives at different road sections in the future can be calculated based on a vehicle speed and a traffic flow of a current road section where the vehicle is located, so that corresponding traffic jam levels when the vehicle arrives at different road sections are determined based on the arrival times of the vehicle at different road sections in the future. A road section whose traffic jam level exceeds the traffic jam level threshold is a jammed road section.

The following examples are carried out for a future state. For example, there are two road sections (a road section A and a road section B) in the navigation route, and there are three different second moments (a moment 1, a moment 2, and a moment 3). The second moments are past moments. The traffic flow sequence includes a traffic flow sequence corresponding to the road section A. The traffic flow sequence corresponding to the road section A can include a traffic flow of the road section A at the moment 1, a traffic flow of the road section A at the moment 2, and a traffic flow of the road section A at the moment 3. The traffic flow sequence includes a traffic flow sequence corresponding to the road section B. The traffic flow sequence corresponding to the road section B is composed of a traffic flow of the road section B at the moment 1, a traffic flow of the road section B at the moment 2, and a traffic flow of the road section B at the moment 3. The traffic flows of each road section at the plurality of different third moments are respectively determined according to the traffic flow sequence of each road section. This determination can be achieved based on a time sequence prediction algorithm. There are three different third moments (a moment 4, a moment 5, and a moment 6). For example, a traffic flow of the road section A at the moment 4, a traffic flow of the road section A at the moment 5 and a traffic flow of the road section A at the moment 6 are predicted through the traffic flow of the road section A at the moment 1, the traffic flow of the road section A at the moment 2, and the traffic flow of the road section A at the moment 3.

For a certain road section, a traffic flow of a future moment is predicted based on the traffic flow of the road section at the past moment. The time sequence prediction algorithm and an average value algorithm are taken as an example. The traffic flow of the road section A at the moment 4 is an average value of the traffic flow of the road section A at the moment 1, the traffic flow of the road section A at the moment 2 and the traffic flow of the road section A at the moment 3. The traffic flow of the road section A at the moment 5 is an average value of the traffic flow of the road section A at the moment 2, the traffic flow of the road section A at the moment 3 and the traffic flow of the road section A at the moment 4. The traffic flow of the road section A at the moment 6 is an average value of the traffic flow of the road section A at the moment 3, the traffic flow of the road section A at the moment 4 and the traffic flow of the road section A at the moment 5. The above description can be applied to the traffic flow of the road section B. For example, the traffic flow of the road section B at the moment 4, the traffic flow of the road section B at the moment 5 and the traffic flow of the road section B at the moment 6 can be obtained. Moments when the vehicle arrives at the road section A and the road section B are determined according to the speed of the vehicle and the distances to the different road sections. States of the road section A and the road section B when the vehicle arrives at the road section A and the road section B in turn are determined according to the traffic flows of the road section A and the road section B at the plurality of different third moments. For example, the vehicle arrives at the road section A at the moment 4. The traffic flow of the road section A at the moment 4 is predicted to include 100 vehicles, so the road section A is in the jammed state which conforms to the target state. The road section A is used as the target road section.

In some embodiments, as an alternative solution of the video portal, if the video portal is not triggered, a video may automatically pop up and be played. For example, an automatic pop-up switch configurable by a user is provided, so that the user configures the playing manner of the video according to a requirement. When an automatic pop-up mode is selected, the video can be automatically pop up and be played, which, for example, is determined according to an urgency degree of a state. If the urgency degree exceeds an urgency degree threshold, the video automatically pops up, and corresponding prompt information is displayed. The urgency degree may be quantified based on the following several aspects: the traffic jam level, the distance to a jammed road section, and/or remaining window time for route change.

In some embodiments, the video may be a live streaming video or a recorded video. The live streaming video is preferred in some examples. In an example, the priority of the live streaming video is higher than that of the recorded video. When there is no live streaming data, the recorded video of the same road section can be used, such as a recorded video of the same traffic flow. The video type is also related to the type of the target state. For a state with no visual change, for example, when a certain road section is closed (e.g., no vehicles enter or exit the road section), the recorded video can be used to save communication traffic.

In some embodiments, a jammed point in a jammed road section is indicated by marking a video (e.g., putting dots on a video). When the live streaming video of the jammed road section is played, a user marks the video to indicate a jammed position (the jammed point) in a road section, such as a point that is not marked as a jammed road section by navigation software and a point that does not conform to a traffic jam level marked by the software, so that the software updates the displaying, re-calculates whether the current navigation route is optimal, and gives a suggestion if the current navigation route is not optimal. Road conditions may be shared to people nearby through a social network. For example, pictures in the video or live streaming may be screen-shot and forwarded to be shared to a user of a social client. Data, such as the length of a traffic jam and the passing time, may also be shared.

In some embodiments, a condition for stopping playing the video may also be configured. The condition for stopping playing the video includes at least one of the following: the road section is no longer jammed; the vehicle passes the jammed road section; and the user turns off the video.

In some embodiments, cameras may be selected according to distances to a vehicle or the user may select cameras, so that videos collected by a proper camera are acquired in response to a selection operation of the user.

In some embodiments, a group chat portal of the same road section may be provided during displaying a video or live streaming. Users of the same jammed road section join the group chat (e.g., a group chat is bound to a jammed road section) through the group chat portal. A user can automatically leave the group chat when leaving the jammed road section, or the user may leave the group chat manually. The group chat can be automatically terminated when the road section is not jammed.

In some embodiments, with regard to the timing for acquiring a video, for example, a video is acquired when a video playing condition has not been satisfied, namely, a video buffering process is completed in advance, so as to ensure that the video can be played once the video playing condition is satisfied, or the video is buffered after the video playing condition is satisfied, so as to effectively save resources consumed for acquiring the video. During displaying a video or live streaming, an intelligent speech assistant is displayed. The video or live streaming is controlled by the intelligent speech assistant. When a direction of the terminal is changed, a display manner of the video and the live streaming can be adjusted, for example, to a vertical screen mode and a landscape mode. The video or live streaming may be displayed in a full screen, or partially displayed. A display content of the video can be adjusted by adjusting pictures, such as a global content or a local content under the camera is displayed.

In a geographic information application system, a traffic jam level of a certain road section can be predicted (e.g., speculated) through a use record of a terminal device on a road and the data provided in the traffic department. Due to the problems of basic data construction such as data sources and data transmission, in an example, it may be difficult to see a current traffic video of a jammed road section at a mobile end in real time. A real-time road condition video refers to a video stream recorded by a partner (e.g., governmental traffic department data, vehicle-mounted automobile data recorder, and the like) or a live streaming video. Road data (e.g., universal road electronic eye data) and video live streaming device data with the same function which are accessed by basic services of an intelligent transportation support video data playing in navigation in the electronic map client, and live streaming videos of a traffic jam of a jammed road section ahead is shown with a safety policy in the navigation driving process.

The navigation processing method provided in the embodiments of this disclosure can provide a prompt of a live streaming video of a traffic jam in the navigation process. As sources of video data partners are diversified, richer live streaming videos of traffic jams can be acquired in the navigation process, thereby effectively improving the information acquisition efficiency.

It is understood that in the embodiments of this disclosure, where relevant data such as user information is involved, when the embodiments of this disclosure are applied to a specific product or technology, in some examples, it may be necessary to obtain permissions or agreements of users, and the collection, use and processing of the relevant data are to comply with the relevant laws, regulations and standards of relevant countries and districts.

An exemplary structure of a navigation processing apparatus 455 implemented as a software module and provided in an embodiment of this disclosure is described below. In some embodiments, as shown in FIG. 3, software modules stored in the navigation processing apparatus 455 of memory 450 may include: a display module 4551, configured to display an electronic map in a human-computer interaction interface; a navigation module 4552, configured to display a navigation route in the electronic map and a video portal of a target road section in the navigation route in response to a navigation operation where the target road section is in a target state; and a video module 4553, configured to play a video of the target road section in response to a triggering operation performed on the video portal where the video includes real scene information of the target road section.

In some embodiments, the navigation module 4552 is further configured to: allocate corresponding display parameters for road sections in different states in the navigation route. Different states correspond to different display parameters, and the display parameters correspond to the target state can be more significant than the display parameters corresponding to non-target states. The navigation module 4552 is configured to display the road sections in the different states according to the display parameters of the different states.

In some embodiments, when the state is used for indicating the traffic jam level, different states can include: jammed, smooth, and slow. When the state is used for indicating the road quality, different states can include: good; obstructed by rain and snow; and containing pavement damage. When the state is used for indicating an accident, different states include an accident-prone state, a safe state, and an accident occurring state.

In some embodiments, the navigation module 4552 is further configured to: perform at least one of the following operations: displaying a first message control at a position, corresponding to the target road section, in the electronic map, and displaying the video portal of the target road section in the first message control; and loading a second message control, and displaying the video portal of the target road section in the second message control, the second message control covering part or all of areas of the electronic map.

In some embodiments, the navigation module 4552 is further configured to: display at least one piece of following information on the first message control or the second message control: a length of the target road section, and expected passing time of the target road section.

In some embodiments, before displaying a video portal of a target road section in the navigation route, the navigation module 4552 is further configured to: determine, if at least one of the following conditions is satisfied, to proceed with processing of performing the displaying a video portal of a target road section in the navigation route: a network communication environment of the electronic map is in an available state; the electronic map is in an online navigation mode; the speed of a vehicle is less than a speed threshold; and a distance between the vehicle and an image capturing device of the target road section is less than a distance threshold.

In some embodiments, before displaying a video portal of a target road section in the navigation route, the navigation module 4552 is further configured to: acquire a traveled mile range of a vehicle where the traveled mile range is a mileage that the vehicle has traveled since the last time the corresponding video portal is displayed for the target state. The navigation module 4552 is further configured to determine, if the traveled mile range is greater than a reminder mile range threshold, to proceed with processing of performing the displaying a video portal of a target road section in the navigation route.

In some embodiments, before displaying a video portal of a target road section in the electronic map, the navigation module 4552 is further configured to: acquire a historical prompt record of the navigation route, and acquire the number of times that the corresponding video portal is displayed for the target route from the historical prompt record; and determine, if the number of times is less than a threshold of the number of prompts, to proceed with processing of performing the displaying a video portal of a target road section in the navigation route.

In some embodiments, when the target road section is provided with a plurality of image capturing devices, the video module 4553 is further configured to: acquire positional relationships between a vehicle and the plurality of image capturing devices respectively, and determine a target image capturing device that satisfies a positional relationship condition; and acquire and play the video of the target road section acquired by the target image capturing device. The positional relationship condition includes one of the following: the distance from the vehicle is shortest; the target image capturing device is located in front of the vehicle, and no other image capturing devices exist between the target image capturing device and the vehicle; and a central portion of an acquisition area includes the vehicle.

In some embodiments, when the target road section is provided with a plurality of image capturing devices, the video module 4553 is further configured to: display an image capturing device list where the image capturing device list includes the plurality of image capturing devices and corresponding acquisition orientations. The video module 4553 is further configured to determine a selected target image capturing device from the plurality of image capturing devices in response to a selection operation performed on the list and acquire and play the video of the target road section acquired by the target image capturing device.

In some embodiments, during displaying, in the electronic map, the navigation route and a video portal of a target road section in the navigation route, the navigation module 4552 is further configured to: determine an urgency degree of the target state according to a distance between a vehicle and the target road section, and a remaining window time for the vehicle to change a route to detour the target road section; and determine, if the urgency degree of the target state is greater than a degree threshold, to proceed with the processing of automatically playing the video of the target road section.

In some embodiments, when the target state is a jammed state, before playing a video of the target road section, the video module 4553 is further configured to: determine a state of each road section at a first moment according to historical traffic flow sequence data of each road section in the navigation route at a plurality of historical moments and determine at least one road section in the jammed state as the target road section. The first moment can be a moment that the triggering operation performed on the video portal is received.

In some embodiments, when the target state is a jammed state, before playing a video of the target road section, the video module 4553 is further configured to: combine corresponding traffic flows of each road section in the navigation route at a plurality of different second moments into a traffic flow sequence, and determine traffic flows of each road section at a plurality of different third moments according to the traffic flow sequence. Each of the second moments can be earlier than a first moment, each of the third moments can be later than the first moment, and the first moment can be a moment that the triggering operation performed on the video portal is received. The video module 4553 is further configured to determine, according to the speed of a vehicle and the traffic flows of each road section at the plurality of different third moments, a state of each road section if the vehicle sequentially arrives at each road section and take at least one road section in the jammed state as the target road section at the arrival of the vehicle.

In some embodiments, during playing a video of the target road section, the video module 4553 is further configured to: acquire, in response to a jammed position setting operation performed on the target road section in the video, a jammed position set in the target road section; and display corresponding prompt information and a new navigation route in a case that at least one of the following conditions is satisfied: the passing time of the navigation route is determined to increase based on the jammed position of the navigation route and a new navigation route is determined to have a shorter passing time than that of the navigation route exists.

In some embodiments, the apparatus further includes: a sharing module 4554, configured to: generate, in response to a sharing operation, a sharing message indicating that the target road section is in the target state, and transmit the sharing message to a social network user. The social network user includes at least one of the following: a social network user traveling in the navigation route and a social network user being querying the navigation route.

In some embodiments, the video module 4553 is further configured to: stop playing the video if a playing stop condition is satisfied. The playing stop condition includes at least one of the following: the target road section is no longer in the target state; a vehicle has passed the target road section; and an instruction to stop playing the video is received.

In some embodiments, the sharing module 4554 is further configured to: display a group chat portal; display a group chat area in response to a triggering operation performed on the group chat portal. The group chat area includes at least one of the following users: a social network user traveling in the target road section, and a social network user having a distance to the target road section less than a distance threshold and traveling to the target road section. The sharing module 4554 is further configured to close the group chat area if a vehicle leaves the target road section or an instruction to leave the group chat is received.

In some embodiments, before playing a video of the target road section, the video module 4553 is further configured to: transmit a video acquisition request to a video proxy server, the video acquisition request carrying a video provider identifier and a video type. The video proxy server acquires, according to the video provider identifier, a playing address of the video type posted by a corresponding video provider. The video module 4553 is further configured to receive the playing address returned by the video proxy server, and acquire the video of the target road section based on the playing address. The video type includes a live video and a recorded video.

In some embodiments, the playing address has timeliness, and the video module 4553 is further configured to: receive a first key returned by the video proxy server; generate an address acquisition request, and encrypt the address acquisition request through the first key to obtain an encrypted address acquisition request; transmit the encrypted address acquisition request to the video proxy server such that the video proxy server decrypts the encrypted address acquisition request through a second key corresponding to the first key; and receive a playing address returned by the video proxy server in a case that the decryption succeeds.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

embodiment of this disclosure provides a computer program product or a computer program. The computer program product or the computer program includes a computer instruction. The computer instruction is stored in a computer-readable storage medium (such as a non-transitory computer-readable storage medium). The processor of the electronic device reads the computer instruction from the computer-readable storage medium. The processor executes the computer instruction, so that the electronic device performs the navigation processing method of the embodiments of this disclosure.

An embodiment of this disclosure provides a computer-readable storage medium (such as a non-transitory computer-readable storage medium) storing instructions (e.g., executable instructions), the executable instructions, when executed by a processor, causing the processor to perform the navigation processing method, for example, the navigation processing method shown in FIG. 4A to FIG. 4C provided in the embodiments of this disclosure.

In some embodiments, the computer-readable storage medium (such as a non-transitory computer-readable storage medium) may be a memory such as an FRAM, a ROM, a programmable read-only memory (PROM), an erasable programmable read-only memory (EPROM), an EEPROM, a flash memory, a magnetic surface memory, an optical disk, or a CD-ROM, or may be any device including one of or any combination of the foregoing memories.

In some embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in a plurality of collaborative files (for example, be stored in files of one or more modules, subprograms, or code parts).

As an example, the executable instruction may be deployed on one electronic device for execution, or executed on a plurality of electronic devices located at one location, or executed on a plurality of electronic devices distributed at a plurality of locations and interconnected by using a communication network.

In summary, according to the embodiments of this disclosure, when a target road section is in a target state, a video portal of the target road section is displayed in a navigation route; a video including real scene information of the target road section is played in response to a triggering operation performed on the video portal, so that finer-grained and more accurate road condition information is displayed for the road section in the target state in a human-computer interaction interface through the video, thereby improving the display efficiency of the human-computer interaction interface and improving the information acquisition efficiency of a user.

The foregoing descriptions are merely embodiments of this disclosure and are not intended to limit the protection scope of this disclosure. Other embodiments shall fall within the protection scope of this disclosure.

What is claimed is:

1. A navigation processing method, comprising:
displaying a map in a user interface;
displaying a navigation route for a vehicle on the map in response to a navigation operation;
in response to at least one condition being satisfied, displaying a first message at a position in the map that corresponds to a target road segment in the navigation route and displaying in the first message a video portal that is to be triggered by a triggering operation performed directly on the video portal, the video portal being of the target road segment in the navigation route, the target road segment being in a target state indicating at least one of a jammed state, an accident state, or a damaged state; and
playing a video of the target road segment in response to the triggering operation performed directly on the video portal, the video comprising captured scene information of the target road segment.

2. The navigation processing method according to claim 1, wherein
the first message includes at least one of: a length of the target road segment and an expected travel time to pass through the target road segment.

3. The navigation processing method according to claim 1, further comprising:
before displaying the video portal of the target road segment in the navigation route, determining whether the at least one condition is satisfied, the at least one condition including one or more of:
a network environment of the map is available;
the map is in an online navigation mode;
a speed of the vehicle is less than a speed threshold; and
a distance between the vehicle and an image capturing device of the target road segment is less than a distance threshold.

4. The navigation processing method according to claim 1, before displaying the video portal, further comprising:
acquiring a traveled distance of the vehicle, the traveled distance being a distance that the vehicle has traveled since a previous time the video portal is displayed for the target state; and
determining whether the traveled distance is greater than a reminder distance threshold, the at least one condition including that the traveled distance is greater than the reminder distance threshold.

5. The navigation processing method according to claim 1, before displaying the video portal, further comprising:
acquiring a historical prompt record of the navigation route;
acquiring a number of times that the video portal has been displayed for the target road segment from the historical prompt record; and
determining whether the number of times is less than a threshold of a number of prompts, the at least one condition including that the number of times is less than the threshold of the number of prompts.

6. The navigation processing method according to claim 1, wherein
the target road segment is provided with a plurality of image capturing devices, and
the playing the video of the target road segment includes:
determining positional relationships between the vehicle and the plurality of image capturing devices, respectively;
determining, based on the positional relationships, a target image capturing device from the plurality of image capturing devices that satisfies a positional relationship condition; and
obtaining and playing the video of the target road segment acquired by the target image capturing device,
wherein the positional relationship condition comprises one of: (i) a distance from the vehicle to the target image capturing device is a shortest among distances from the vehicle to the plurality of image capturing devices; (ii) the target image capturing device is located in front of the vehicle, and no image capturing devices are located between the target image capturing device and the vehicle; and (iii) a central portion of an acquisition area that is acquired by the target image capturing device comprises the vehicle.

7. The navigation processing method according to claim 1, wherein
the target road segment is provided with a plurality of image capturing devices, and
the playing the video of the target road segment includes:
displaying an image capturing device list that includes the plurality of image capturing devices and corresponding capturing orientations;
determining a target image capturing device from the plurality of image capturing devices in response to a selection operation performed on the image capturing device list;

acquiring the video of the target road segment by the target image capturing device; and playing the video of the target road segment acquired by the target image capturing device.

8. The navigation processing method according to claim 1, further comprising:

during displaying the navigation route and the video portal, determining a degree of urgency of the target state based on (i) a distance between the vehicle and the target road segment (ii) and a remaining time window for the vehicle to deviate from the navigation route to bypass the target road segment; and determining whether the degree of urgency of the target state is greater than a degree threshold, the at least one condition including that the degree of urgency of the target state is greater than the degree threshold.

9. The navigation processing method according to claim 1, wherein the target state is the jammed state, and before playing the video of the target road segment, the navigation processing method further includes:

determining a state of each road segment in the navigation route at a first moment based on historical traffic flow sequence data of the respective road segment at a plurality of historical moments that is prior to the first moment, the first moment being a moment that the triggering operation is received, the state indicating a road condition of the respective road segment in the navigation route; and determining at least one road segment that is in the jammed state as the target road segment.

10. The navigation processing method according to claim 1, wherein the target state is the jammed state, and before playing the video of the target road segment, the navigation processing method further includes:

combining corresponding traffic flows of each road segment in the navigation route at a plurality of second moments into a traffic flow sequence of the respective road segment, each of the plurality of second moments being earlier than a first moment, and the first moment being a moment that the triggering operation is received;

determining traffic flows of each road segment at a plurality of third moments based on the respective combined traffic flow sequence, each of the plurality of third moments being later than the first moment;

determining, based on a speed of the vehicle and the determined traffic flows of each road segment at the plurality of third moments, a state of each road segment at a respective moment that the vehicle arrives at the respective road segment in response to the vehicle sequentially arriving at the respective road segment, the state indicating a road condition of the respective road segment in the navigation route; and determining a road segment that is in the jammed state at the moment that the vehicle arrives at the respective road segment as the target road segment.

11. The navigation processing method according to claim 1, further comprising:

during playing the video of the target road segment, acquiring, in response to a jammed position setting operation performed on the target road segment in the video, a jammed position set in the target road segment; and displaying prompt information and a new navigation route in response to at least one of:

a travel time of the navigation route increases based on the jammed position in the navigation route; or the new navigation route having a shorter travel time than the travel time of the navigation route is determined.

12. The navigation processing method according to claim 1, further comprising:

generating, in response to a sharing operation, a sharing message indicating that the target road segment is in the target state; and transmitting the sharing message to a social network user, including at least one of: a social network user traveling in the navigation route or a social network user querying the navigation route.

13. The navigation processing method according to claim 1, further comprising:

stopping play back of the video in response to a playing stop condition being satisfied, the playing stop condition including at least one of: the target road segment is no longer in the target state; the vehicle has passed the target road segment; and an instruction to stop playing the video is received.

14. The navigation processing method according to claim 1, further comprising:

displaying a group chat portal;

displaying a group chat area in response to a triggering operation performed on the group chat portal, the group chat area including at least one of: (i) a social network user traveling in the target road segment or (ii) a social network user traveling to the target road segment and having a distance to the target road segment that is less than a distance threshold; and closing the group chat area in response to the vehicle leaving the target road segment or an instruction to leave the group chat area being received.

15. The navigation processing method according to claim 1, before playing the video of the target road segment, further comprising:

transmitting a video acquisition request to a video proxy server, the video acquisition request carrying a video provider identifier and a video type, a playing address of the video type posted by a video provider is acquired by the video proxy server based on the video provider identifier;

receiving the playing address returned by the video proxy server, and acquiring the video of the target road segment based on the playing address, the video type comprising a live video and a recorded video.

16. The navigation processing method according to claim 15, wherein the playing address is time-sensitive; and the receiving the playing address includes:

receiving a first key returned by the video proxy server;

generating an address acquisition request; and transmitting the address acquisition request to the video proxy server, an encrypted playing address being returned by the video proxy server, wherein the encrypted playing address is obtained by encrypting a second key corresponding to the first key and the playing address is acquired in response to the encrypted playing address being decrypted based on the first key.

17. The navigation processing method according to claim 1, wherein the displaying the navigation route in the map comprises:

allocating display parameters for road segments in the navigation route in different states, each of the different states corresponding to a respective different display parameter, the display parameters corresponding to the target state having a stronger visual impact than the display parameters corresponding to one or more states that are different from the target state; and displaying the road segments in the different states based on the respective display parameters.

18. A navigation processing apparatus, comprising:

processing circuitry configured to:

display a map in a user interface;

display a navigation route for a vehicle on the map in response to a navigation operation;

in response to at least one condition being satisfied, display a first message at a position in the map that corresponds to a target road segment in the navigation route and displaying in the first message a video portal that is to be triggered by a triggering operation performed directly on the video portal, the video portal being of the target road segment in the navigation route, the target road segment being in a target state indicating at least one of a jammed state, an accident state, or a damaged state; and play a video of the target road segment in response to the triggering operation performed directly on the video portal, the video comprising captured scene information of the target road segment.

19. A non-transitory computer-readable storage medium, storing instructions when executed by a processor cause the processor to perform:

displaying a map in a user interface;

displaying a navigation route for a vehicle on the map in response to a navigation operation;

in response to at least one condition being satisfied, displaying a first message at a position in the map that corresponds to a target road segment in the navigation route and displaying in the first message a video portal that is to be triggered by a triggering operation performed directly on the video portal, the video portal being of the target road segment in the navigation route, the target road segment being in a target state indicating at least one of a jammed state, an accident state, or a damaged state; and playing a video of the target road segment in response to the triggering operation performed directly on the video portal, the video comprising captured scene information of the target road segment.

* * * * *